(12) United States Patent
Lim

(10) Patent No.: US 7,492,436 B2
(45) Date of Patent: Feb. 17, 2009

(54) LIQUID CRYSTAL DISPLAY DEVICE AND METHOD OF FABRICATING THE SAME

(75) Inventor: Kyoung Nam Lim, Kyongsangbuk-do (KR)

(73) Assignee: LG Displays Co., Ltd., Seoul (KR)

( * ) Notice: Subject to any disclaimer, the term of this patent is extended or adjusted under 35 U.S.C. 154(b) by 72 days.

(21) Appl. No.: 10/852,753

(22) Filed: May 25, 2004

(65) Prior Publication Data

US 2005/0190338 A1 Sep. 1, 2005

(30) Foreign Application Priority Data

Feb. 26, 2004 (KR) .................. 10-2004-0013194

(51) Int. Cl.
*G02F 1/1339* (2006.01)

(52) U.S. Cl. ..................... 349/156; 349/155

(58) Field of Classification Search ................. 349/141, 349/155–157
See application file for complete search history.

(56) References Cited

U.S. PATENT DOCUMENTS

| 6,259,505 B1 * | 7/2001 | Makino ............... 349/153 |
|---|---|---|
| 6,507,385 B1 * | 1/2003 | Nishiyama et al. .......... 349/156 |
| 6,795,141 B2 * | 9/2004 | Yamada ................. 349/106 |
| 7,142,277 B2 * | 11/2006 | Choi et al. ............... 349/155 |
| 2004/0114087 A1 * | 6/2004 | Cho et al. ................ 349/155 |
| 2004/0183991 A1 * | 9/2004 | Kuo ..................... 349/155 |
| 2004/0201815 A1 * | 10/2004 | Yamamoto ............... 349/156 |
| 2005/0046779 A1 * | 3/2005 | Sumi et al. .............. 349/155 |

FOREIGN PATENT DOCUMENTS

| JP | 10-160920 | 6/1998 |
|---|---|---|
| JP | 2000-298282 | 10/2000 |
| JP | 2001-100652 | 4/2001 |
| JP | 2002-169166 | 6/2002 |
| JP | 2002-341354 | 11/2002 |
| JP | 2003156750 A * | 5/2003 |
| JP | 2004-046123 | 2/2004 |

* cited by examiner

*Primary Examiner*—David Nelms
*Assistant Examiner*—Thanh-Nhan P Nguyen
(74) *Attorney, Agent, or Firm*—McKenna Long & Aldridge LLP

(57) ABSTRACT

A liquid crystal display (LCD) device includes a first substrate having first and second regions thereon, the first region having a step coverage higher than a step coverage of the second region, a second substrate bonded to the first substrate, the second substrate having a first column spacer corresponding to the first region of the first substrate and a second column spacer corresponding to the second region of the first substrate, and a liquid crystal layer between the first and second substrates.

2 Claims, 18 Drawing Sheets generation of shift on upper substrate by touch

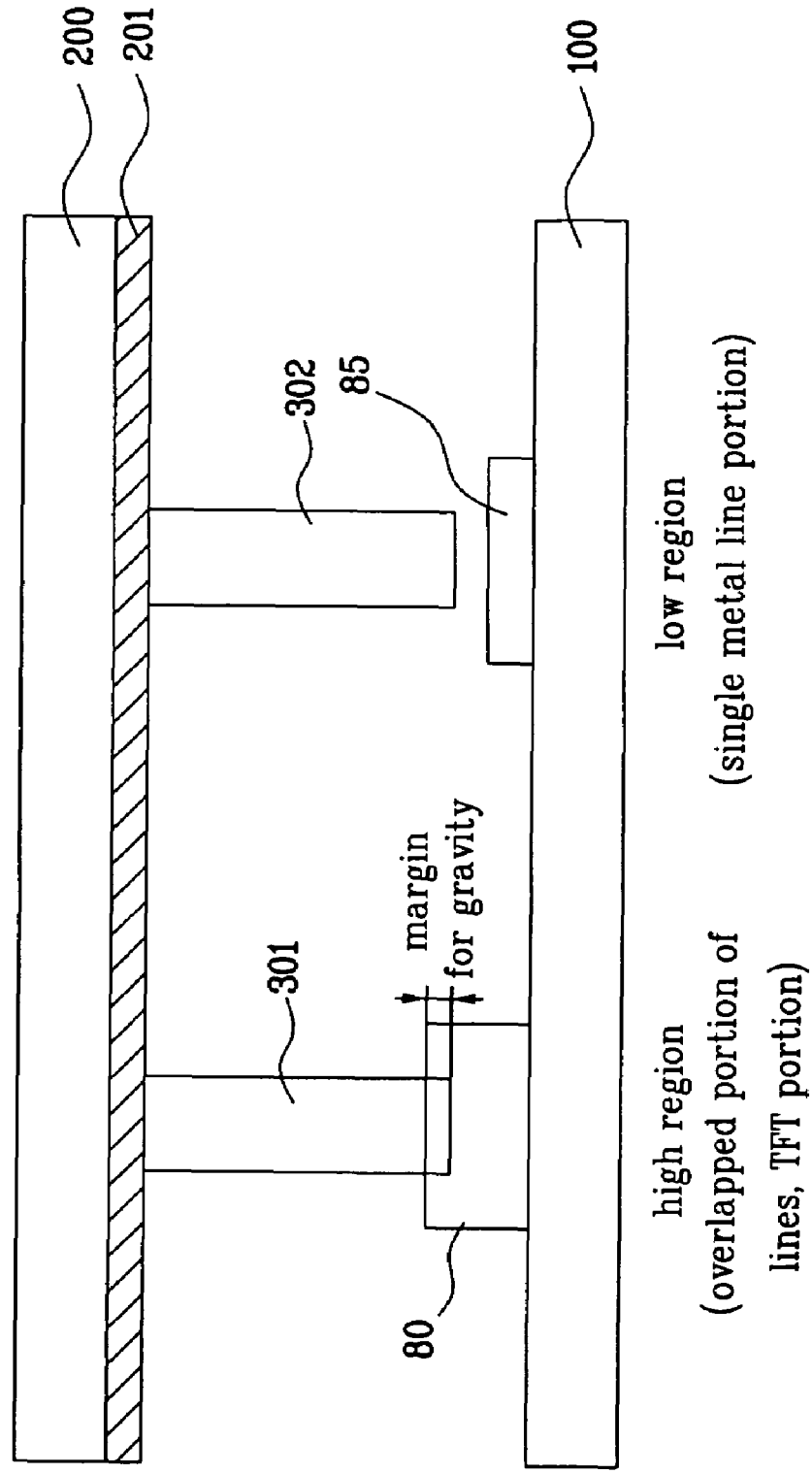

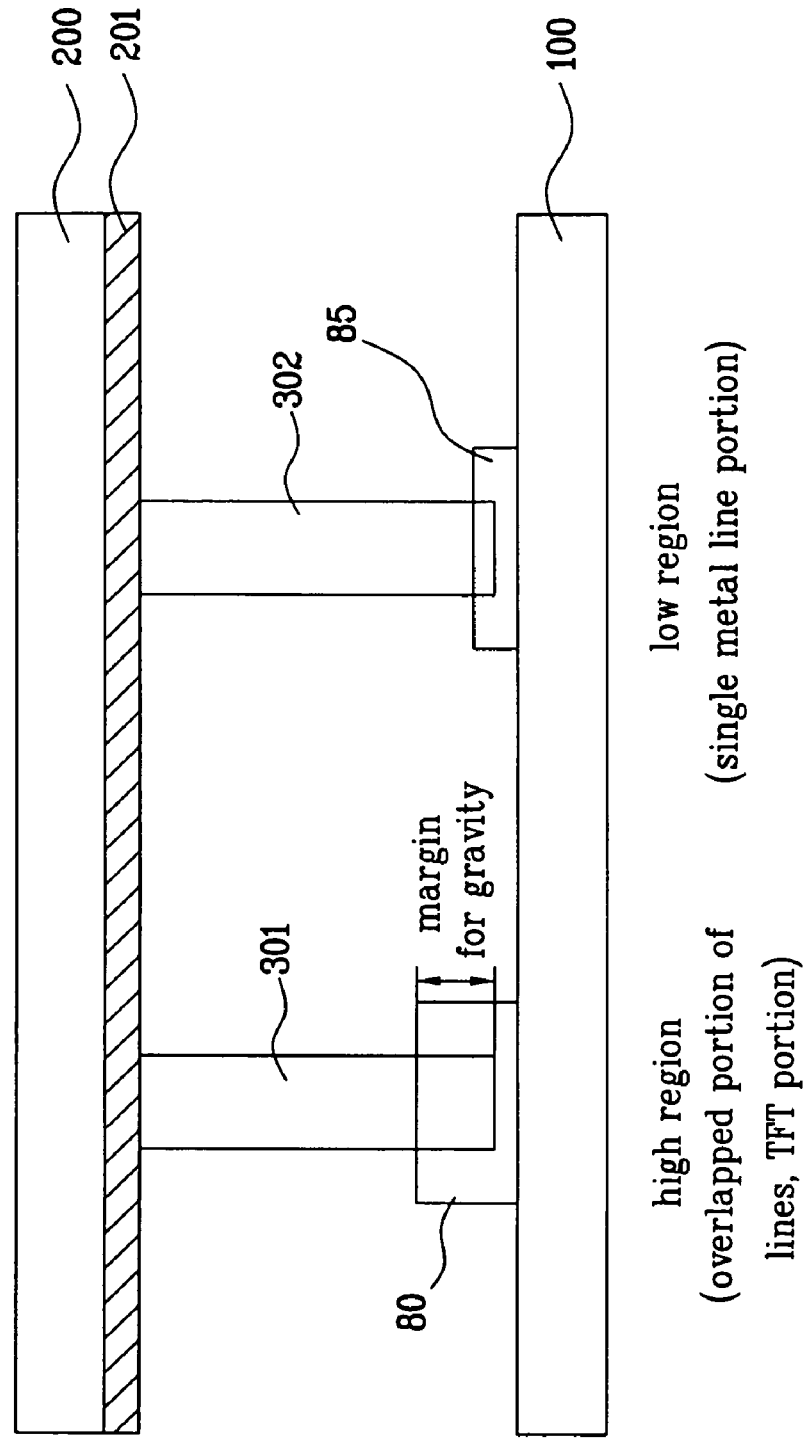

LIQUID CRYSTAL DISPLAY DEVICE AND METHOD OF FABRICATING THE SAME

The present application claims the benefit of Korean Application No. P2004-13194, filed in Korea on Feb. 26, 2004, which is hereby incorporated by reference.

BACKGROUND OF THE INVENTION

1. Field of the Invention

The present invention relates to a display device and a method of fabricating a display device, and more particularly, to a liquid crystal display (LCD) device and a method of fabricating an LCD device.

2. Discussion of the Related Art

As demand for various display devices increases, development of various type of flat display devices, such as LCD device, plasma display panel (PDP) device, electroluminescent display (ELD) device, and vacuum fluorescent display (VFD) device, has increased. Among these various flat display devices, LCD devices have been commonly used because of their thin profile, light weight, and low power consumption. For example, LCD devices are commonly used as a substitute for cathode ray tube (CRT) devices. In addition, LCD devices are commonly used in notebook computers, computer monitors, and televisions. However, in order to use LCD devices in general display devices, the LCD devices must be produce high quality images, such as high resolution and high luminance with a large-sized screen, while still maintaining their light weight, thin profile, and low power consumption.

FIG. 1 is a schematic perspective view of an LCD device according to the related art. In FIG. 1, an LCD device includes first and second substrates 1 and 2, and a liquid crystal layer between the first and second substrates 1 and 2 formed by an injection method. The first substrate 1 includes a plurality of gate lines 4 arranged along a first direction at fixed intervals, a plurality of data lines 5 arranged along a second direction perpendicular to the first direction at fixed intervals, a plurality of pixel electrodes 6 arranged in a matrix configuration within pixel regions P defined by crossing of the gate and data lines 4 and 5, and a plurality of thin film transistors T enabled according to signals supplied to the gate lines 4 for transmitting signals from the data lines 5 to the pixel electrodes 6. The second substrate 2 includes a black matrix layer 7 that prevents light from portions of the first substrate 1, except for the pixel regions P, an R/G/B color filter layer 8 for displaying colored light, and a common electrode 9 for producing images.

In FIG. 1, since the liquid crystal layer 3 is formed between the first and second substrates 1 and 2, liquid crystal molecules of the liquid crystal layer 3 are driven by an electric field generated between the pixel electrode 6 and the common electrode 9. For example, an alignment direction of the liquid crystal molecules of the liquid crystal layer 3 is controlled by the induced electric field thereto. Accordingly, light irradiated through the liquid crystal layer 3 may be controlled by the alignment direction of the liquid crystal molecules, thereby displaying images. The LCD device of FIG. 1 is commonly referred to as a twisted neumatic (TN) mode LCD device, which has disadvantageous characteristics, such as narrow viewing angles.

In order to overcome these problems of the TN mode LCD device, an in-plane switching (IPS) mode LCD device has been developed. In the FPS mode LCD device, a pixel electrode and a common electrode are formed in a pixel region in parallel to each other at a fixed interval therebetween. Accordingly, an electric field parallel to substrates is generated between the pixel electrode and the common electrode, thereby aligning liquid crystal molecules of a liquid crystal layer by the electric field parallel to the substrates.

FIGS. 2 and 3 are flow charts of method for fabricating an LCD device according to the related art, wherein FIG. 2 shows a liquid crystal injection method and FIG. 3 shows a liquid crystal dispersion method.

In FIG. 2, the method for fabricating an LCD device is divided into three processes, including an array process, a cell process, and a module process. The array process largely includes two steps of forming a TFT array having gate and data lines, a pixel electrode, and a thin film transistor on a first substrate, and forming a color filter array having a black matrix layer, a color filter layer, and a common electrode on a second substrate. During the array process, a plurality of LCD panels are formed on one large-sized glass substrate, and the TFT array and the color filter array are formed within each of the LCD panels. Then, the TFT substrate and the color filter substrate are moved to a cell process line. Subsequently, an alignment material is coated on the TFT substrate and the color filter substrate, and an alignment process (i.e., rubbing process) S10 is performed to the substrates to obtain a uniform alignment direction of liquid crystal molecules. At this time, the alignment process S10 is carried out in order of processes for cleaning before coating of an alignment layer, printing the alignment layer, baking the alignment layer, inspecting the alignment layer, and rubbing the alignment layer. Accordingly, the TFT substrate and the color filter substrate are respectively cleaned (S20).

Then, ball spacers for maintaining a cell gap between the two substrates are scattered on one of the two substrates (S30), and a seal pattern is formed corresponding to the circumference of respective LCD panel regions to bond the two substrates to each other (S40). At this time, the seal pattern includes a liquid crystal injection inlet through which liquid crystal material is injected. The ball spacers are formed of plastic balls or minute elastic particles. Then, the TFT substrate and the color filter substrate having the seal pattern therebetween are position to oppose each other and bonded to each other, and then the seal pattern is hardened (S50).

Then, the bonded TFT and color filter substrates are cut into individual LCD panel regions (S60), thereby manufacturing the unit LCD panels each having a fixed size. Subsequently, the liquid crystal material is injected to the LCD panel through the liquid crystal injection inlet, and the liquid crystal injection inlet is sealed (S70), thereby forming a liquid crystal layer.

After an inspection process (S80) for observing external appearances and testing for electric failures in the LCD panel is performed, the process of manufacturing the LCD device is completed.

During the process for injecting the liquid crystal material, the LCD panel and a container having liquid crystal material therein are provided within a vacuum chamber. Accordingly, moisture and air bubbles in the liquid crystal material and the container are simultaneously removed, and an interior space of the LCD panel is maintained in a vacuum state. Then, the liquid crystal injection inlet of the LCD panel is dipped into the container having the liquid crystal material in the vacuum state, and the vacuum state inside the chamber is changed to an atmospheric pressure. Thus, the liquid crystal material is injected into the interior of the LCD panel through the liquid crystal injection inlet according to a pressure difference between the interior of the LCD panel and the vacuum chamber.

However, the injection method has the following disadvantages. First, after cutting the large-sized glass substrate into the LCD panel regions, the liquid crystal injection inlet is dipped into the container having the liquid crystal material while maintaining the vacuum state between the two substrates. Thus, significant amounts of time are required for injecting the liquid crystal material between the two substrates, thereby lowering production yield. When forming large-sized LCD devices, it is difficult to completely inject the liquid crystal material into the inside of the LCD panel, thereby causing the failure due to incomplete injection of the liquid crystal material. Furthermore, significant amounts of time are required for injecting the liquid crystal material into large-sized spaces for large-sized LCD devices.

In order to overcome these problems of the liquid crystal injection method, the liquid crystal dispersion method has been developed, in which two substrates are bonded to each other after dispersing liquid crystal material on any one of the two substrates. In FIG. 3, before bonding the two substrates, the liquid crystal material is dispersed on any one of the two substrates. Accordingly, it is impossible to use ball spacers for maintaining a cell gap between the two substrates since the ball spacers move along a dispersion direction of the liquid crystal material. Thus, instead of the ball spacers, patterned spacers or column spacers are fixed to the substrate to maintain the cell gap between the two substrates. As shown in FIG. 3, during an array process, a black matrix layer, a color filter layer, and an overcoat layer are formed on the color filter substrate. Then, a photosensitive resin is formed on the overcoat layer, and selectively removed to form the column spacer on the overcoat layer above the black matrix layer. The column spacers may be formed in a photo process or an ink-jet process.

Then, alignment layers are respectively coated on entire surfaces of the TFT substrate and the color filter substrate including the column spacers, and a rubbing process is performed thereto. After cleaning the TFT substrate and the color filter substrate (S101), the liquid crystal material is dispersed on one of the two substrates (S102), and a seal pattern is formed in the circumference of an LCD panel region on the other of the two substrates by a dispensing device (S103). At this time, it is possible to perform dispersion of the liquid crystal and formation of the seal pattern on any one of the two substrates.

After the other substrate having no dispersion of the liquid crystal material is inverted (S104), the TFT substrate and the color filter substrate are bonded to each other by pressure, and the seal patterned is hardened (S105). Subsequently, the bonded substrates are cut into the respective LCD panels (S106). In addition, an inspection process (S107) for observing external appearances and tests for electric failures in the LCD panel are performed, so that the process of manufacturing the LCD device is completed.

In the method of manufacturing the LCD device according to the liquid crystal dispersion method, the column spacer is formed on the color filter substrate, and the liquid crystal material is dispersed on the TFT substrate, then the two substrates are bonded to each other, thereby forming the LCD panel. Accordingly, the column spacer is fixed on the predetermined portion of the color filter substrate. In addition, the column spacer having a predetermined height is in contact with the predetermined portion of the TFT substrate corresponding to the gate or data line.

However, the column spacer of the LCD device according to the liquid crystal dispersion method causes the following problems to the LCD panel. For example, when the LCD device is formed by the liquid crystal dispersion method, the column spacers are formed on the color filter substrate corresponding to the gate or data line. Accordingly, the column spacers are formed at the same height to be corresponding to the line region having the same width (gate or data line). In addition, the columns spacers having the same height are formed on the color filter substrate in opposite to the TFT substrate, and the two substrates are bonded to each other. Since the supportive force of the column spacers is weak, the LCD panel may suffer from problems due to gravity. For example, when the LCD device is at a high temperature, the LCD panel may have a protruding portion because the liquid crystal material has large thermal expansion characteristics. When the LCD panel is placed in a vertical direction, the liquid crystal molecules of the LCD panel migrate to the lower-corner direction, thereby causing a gathering of liquid crystal molecules to the predetermined portion on the LCD panel due to the effects of gravity.

FIG. 4A is a cross sectional view of a color filter substrate having column spacers according to the related art, and FIG. 4B is a cross sectional view of bonded TFT and color filter substrates according to the related art. In FIG. 4A, a plurality of column spacers 20 are formed on a black matrix layer (not shown) of a color filter substrate 2 at fixed intervals, wherein each of the column spacers 20 is formed at a height "h." Then, as shown in FIG. 4B, the color filter substrate 2 having the column spacers 20 thereon is bonded to a TFT substrate 1. Accordingly, the height "h" of the column spacer 20 decreases to a height "h'" due to pressure created during the bonding process.

As shown in FIGS. 4A and 4B, after the bonding process, the column spacer 20 of an LCD panel 10 has the height "h'" corresponding to a cell gap. Accordingly, when the liquid crystal material expands at high temperatures, the column spacer 200 compensates the supportive force for the TFT substrate 1 and the color filter substrate 2 in the extent corresponding to a thickness difference "h-h'" between the height "h" of the column spacer 200 and the cell gap "h'." Thus, the thickness difference "h-h'" between the height "h" of the column spacer 200 and the cell gap "h'" corresponds to a margin to compensate for gravity.

In FIGS. 4A and 4B, the column spacers 20 are formed on the portions corresponding to the line regions having the same width, whereby the thickness difference "h-h'" is limited to 0.1 mm to 0.15 mm. Furthermore, since the column spacers 20 are patterned, the column spacers 20 may each have slightly different heights, whereby it is impossible to obtain uniformity of gravity on the entire regions of the LCD panel. As compared with ball spacers each having a spherical end, the column spacer has a larger contact area with the substrate, thereby generating significant frictional forces between the column spacer 20 and the substrate. Accordingly, if a screen of the LCD device having the column spacers 20 is touched, spots will be generated on the screen and will remain for a long time.

FIG. 5A is a plan view of an LCD device according to the related art, and FIG. 5B is a cross sectional view along I-I' of FIG. 5A according to the related art. In FIG. 5A, if an LCD panel 10 is continuously touched with a finger along a predetermined direction, the upper substrate 2 of the LCD panel is shifted at a predetermined interval along the touch direction, as shown in FIG. 5B. When the cylindrical column spacers are in contact with the lower and upper substrates 1 and 2, they cause significant frictional forces between the column spacers and the two opposing substrates. Thus, the liquid crystal molecules between the column spacers are not restored to their original states, thereby generating spots on the screen. In addition, when the LCD panel is touched with the finger along the predetermined direction, as shown in FIG. 5B, the liquid crystal molecules gather within the region around the touched portion, whereby the region around the touched portion protrudes. In this case, the cell gap "h1" corresponding to the protruding portion is higher than the cell gap "h2" of the remaining portions, thereby causing light leakage. Meanwhile, since the touched portion has no liquid crystal molecules, blurred portions appear on the screen in a black state, thereby deteriorating luminance of the LCD panel 10. Furthermore, the ball spacers are formed on the substrate in a large amount, but the column spacers are selectively formed on the predetermined regions of the LCD panel. Accordingly, when the LCD panel is pressed at a predetermined portion having no column spacers, the substrates bend and form a hollow state due to low restoring speed of the substrates, thereby generating spots on the screen of the LCD panel.

SUMMARY OF THE INVENTION

Accordingly, the present invention is directed to an LCD device and a method of fabricating an LCD device that substantially obviates one or more problems due to limitations and disadvantages of the related art.

An object of the present invention is to provide an LCD device and a method of manufacturing the same, to form a plurality of column spacers on a color filter substrate corresponding to predetermined portions of a TFT substrate having the different heights.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described, a liquid crystal display (LCD) device includes a first substrate having first and second regions thereon, the first region having a step coverage higher than a step coverage of the second region, a second substrate bonded to the first substrate, the second substrate having a first column spacer corresponding to the first region of the first substrate and a second column spacer corresponding to the second region of the first substrate, and a liquid crystal layer between the first and second substrates.

In another aspect, a liquid crystal display (LCD) device includes first and second substrates facing each other, a plurality of gate and data lines on the first substrate, the gate and data lines crossing each other at crossing regions to define a plurality of pixel regions, a plurality of thin film transistors each formed at the crossing region of the gate and data lines, a plurality of pixel and a plurality of common electrodes each within one of the pixel regions, a first column spacer on the second substrate corresponding to one of the thin film transistors of the first substrate, a second column spacer on the second substrate corresponding to one of the gate lines and the data lines of the first substrate, and a liquid crystal layer between the first and second substrates.

In another aspect, a liquid crystal display (LCD) device includes first and second substrates facing each other, a plurality of gate and data lines on the first substrate, the gate and data lines crossing each other at crossing regions to define a plurality of pixel regions, a plurality of thin film transistors each formed at the crossing regions of the gate and data lines, a plurality of pixel electrodes each within one of the pixel regions, a first column spacer on the second substrate corresponding to one of the thin film transistors of the first substrate, a second column spacer on the second substrate corresponding to one of the gate lines and the data lines of the first substrate, and a liquid crystal layer between the first and second substrates.

In another aspect, a liquid crystal display (LCD) device includes first and second substrates facing each other, a plurality of gate and data lines on the first substrate, the gate and data lines crossing each other at crossing regions to define a pixel region, a plurality of thin film transistors each formed at one of the crossing regions of the gate and data lines, a plurality of pixel and a plurality of common electrodes each within one of the pixel regions, a first column spacer on the second substrate corresponding to an overlapped portion of the gate and data lines, a second column spacer on the second substrate corresponding to one of the gate lines and one of the data line of the first substrate except at the overlapped portion of the gate and data lines, and a liquid crystal layer between the first and second substrates.

In another aspect, a liquid crystal display (LCD) device includes first and second substrates facing each other, a plurality of gate and data lines on the first substrate, the gate and data lines crossing each other at crossing regions to define a plurality of pixel regions, a plurality of thin film transistors each formed at one of the crossing regions of the gate and data lines, a plurality of pixel electrodes each within one of the pixel regions, a first column spacer on the second substrate corresponding to an overlapped portion of the gate and data lines, a second column spacer on the second substrate corresponding to one of the gate lines and one of the data lines of the first substrate except at the overlapped portion of the gate and data lines, and a liquid crystal layer between the first and second substrates.

In another aspect, a method of manufacturing a liquid crystal display (LCD) device includes preparing a first substrate having a thin film transistor array, preparing a second substrate having a color filter array to oppose the first substrate, forming first and second column spacers on the second substrate corresponding to one of first and second regions of the first substrate, the first region having a step coverage higher than a step coverage of the second region, forming a liquid crystal layer between the first and second substrates, and bonding the first and second substrates to each other.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principle of the invention. In the drawings:

FIGS. 7A to 7C are schematic cross sectional views of an exemplary LCD device according to the present invention;

DETAILED DESCRIPTION OF THE PREFERRED EMBODIMENTS

Reference will now be made in detail to the preferred embodiments of the present invention, examples of which are illustrated in the accompanying drawings.

Figure 1:
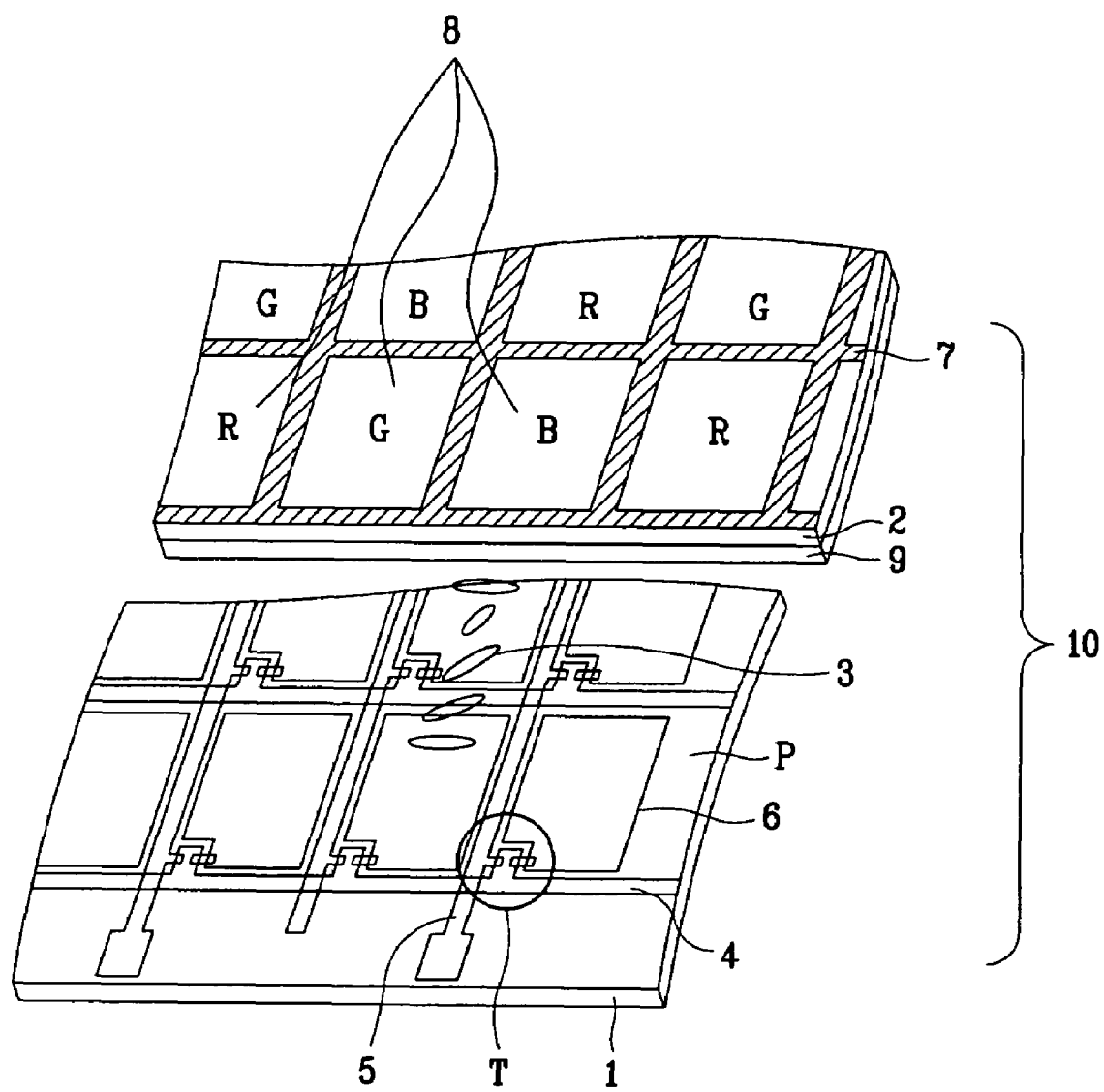
FIG. 1 is a schematic perspective view of an LCD device according to the related art.
Figure 2:
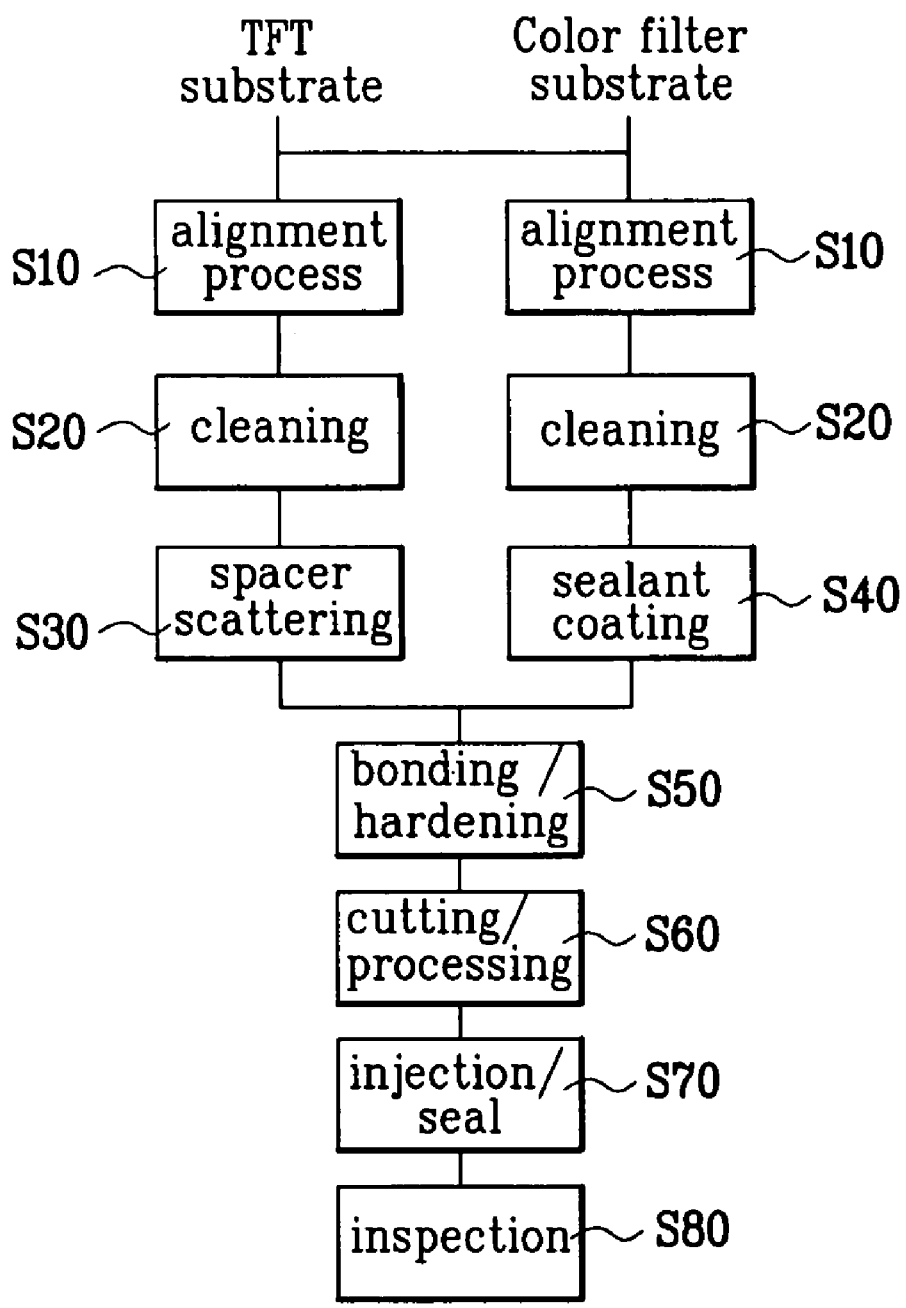
FIG. 2 is a flow chart of a method of fabricating an LCD device according to the related art.
Figure 3:
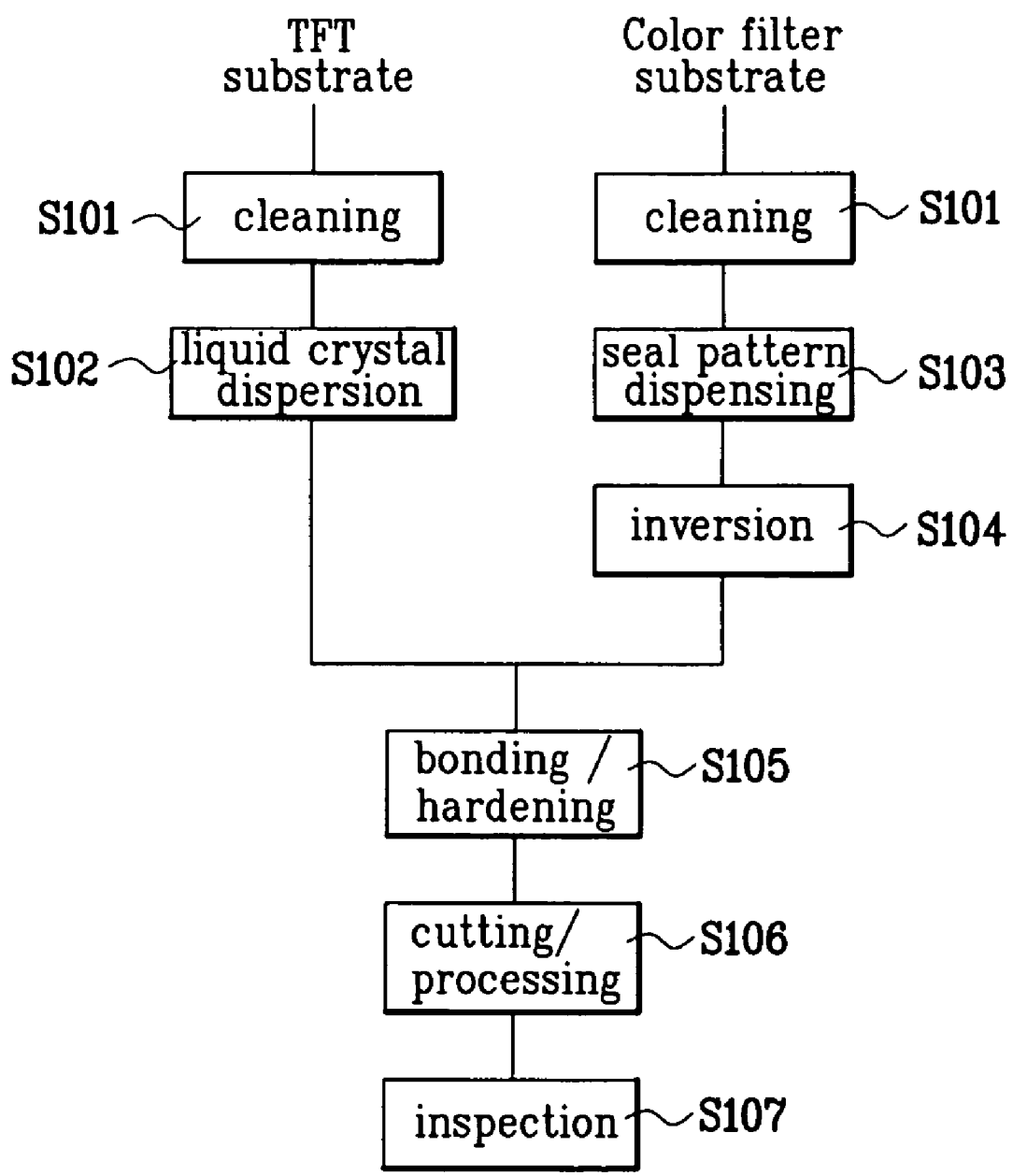
FIG. 3 is a flow chart of another method of fabricating an LCD device according to the related art.
Figure 4A:
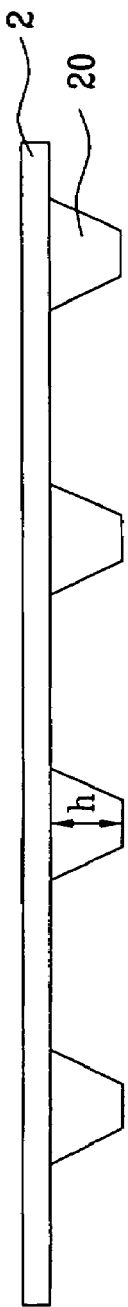
FIG. 4A is a cross sectional view of a color filter substrate having column spacers according to the related art.
Figure 4B:
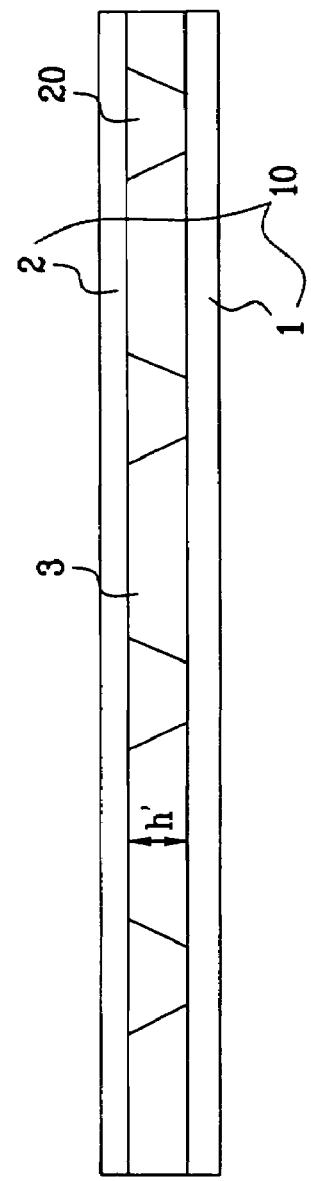
FIG. 4B is a cross sectional view of bonded TFT and color filter substrates according to the related art.
Figure 5A:
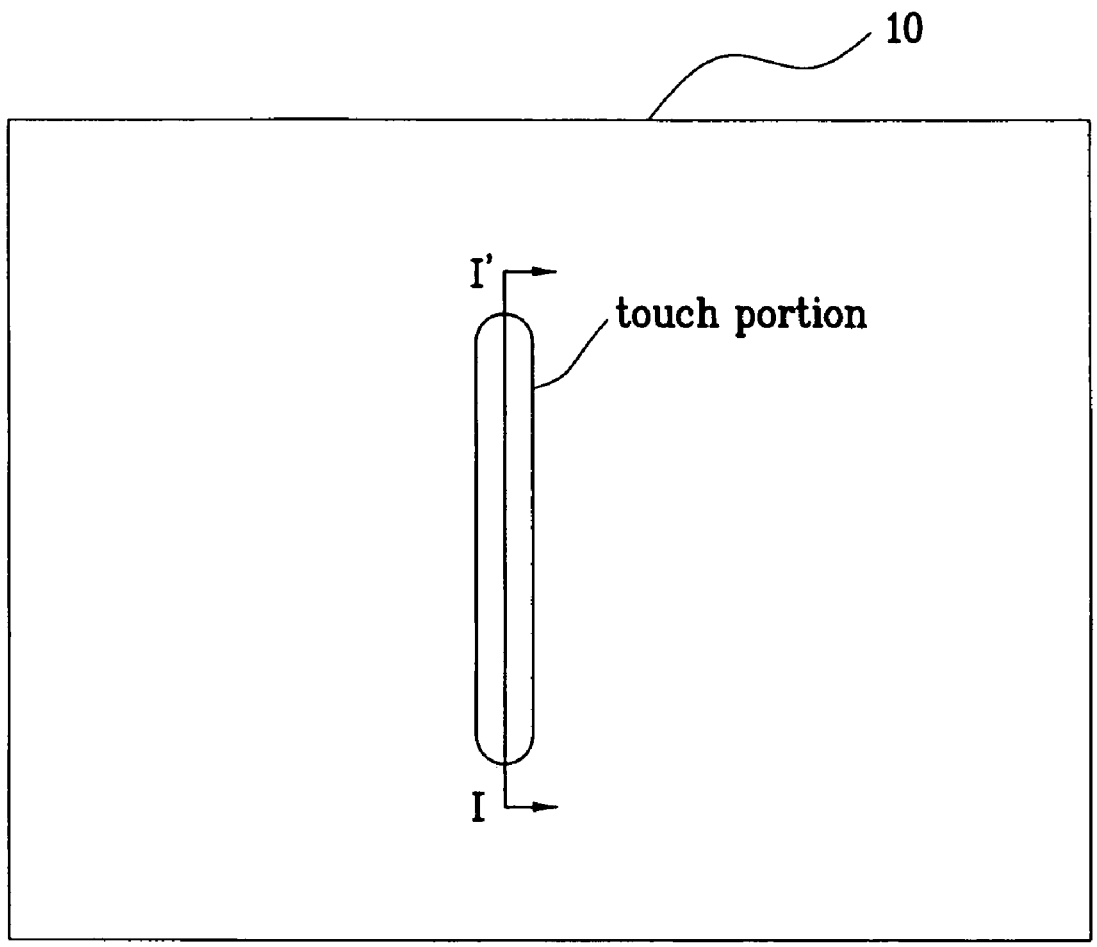
FIG. 5A is a plan view of an LCD device according to the related art.
Figure 5B:
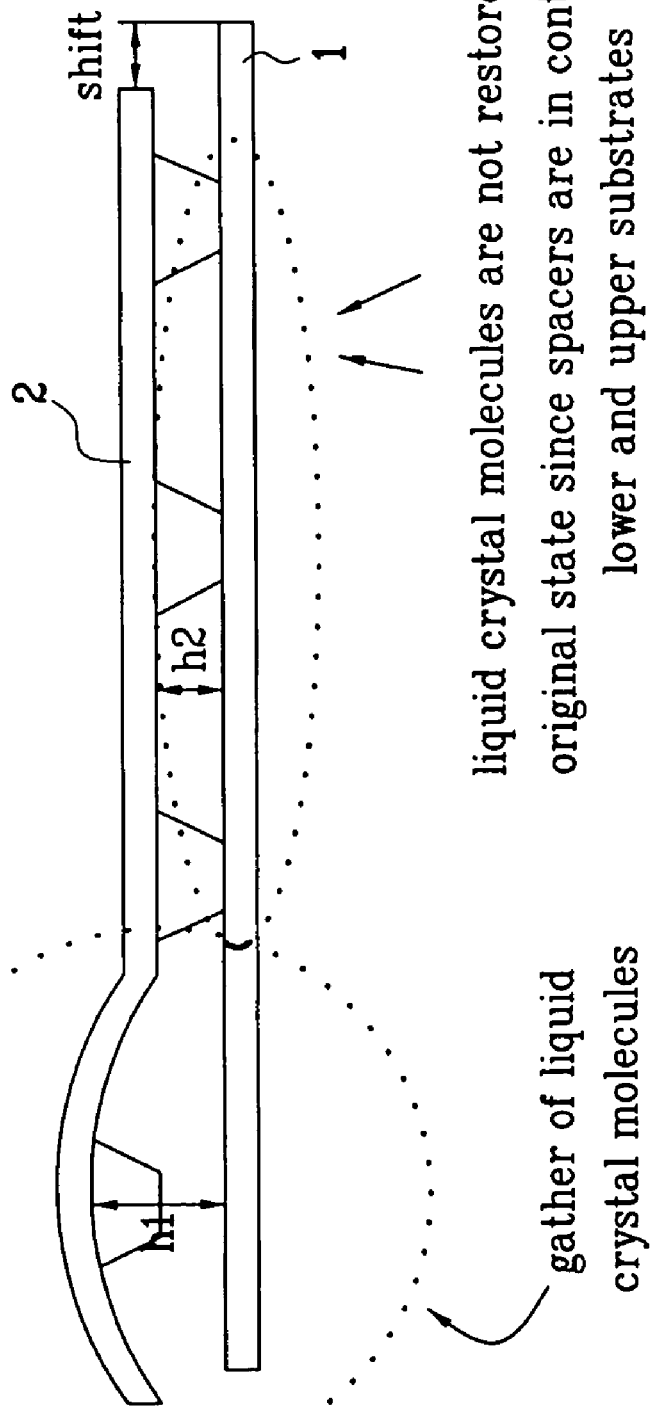
FIG. 5B is a cross sectional view along I-I' of FIG. 5A according to the related art.
Figure 6:
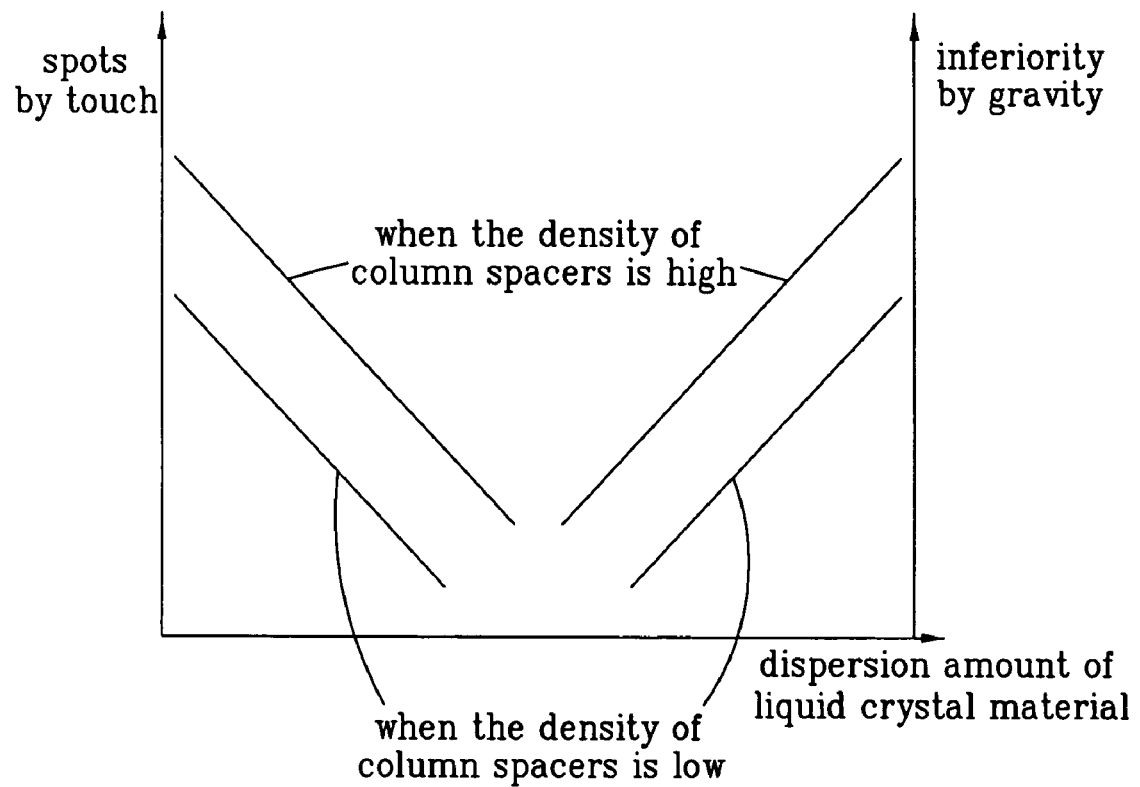
FIG. 6 is a diagram demonstrating relationships between spots, gravity, and dispersion of liquid crystal material.

FIG. 6 is a diagram demonstrating relationships between spots, gravity, and dispersion of liquid crystal material. In FIG. 6, as a large-sized LCD panel is developed, a liquid crystal layer of an LCD device is formed in a liquid crystal dispersion method, thereby improving production yield, and column spacers functioning as supporters are formed between lower and upper substrates. As shown in FIG. 6, the density of the column spacers and the amount of liquid crystal material are important in order to prevent problems within the LCD panel, such as the spots on the LCD panel by touch, the gather of liquid crystal molecules due to gravity, and formation of a hollow portion in the LCD panel by external impacts.

When the LCD device is at a high temperature, the LCD panel may have a protruding portion due to high thermal expansion of the liquid crystal material. When the LCD panel is placed along a vertical direction, the liquid crystal molecules of the LCD panel migrate along a lower-corner direction, thereby causing a gathering of liquid crystal molecules to the predetermined portion on the LCD panel due to gravity. In addition, when the LCD panel is touched with a finger or a stylus along a predetermined direction, the liquid crystal molecules gather to the region around the touched portion, wherein the touched portion has no liquid crystal molecules, thereby generating light leakage in a black state.

When touching the LCD panel, a shift is generated at a predetermined direction between the lower and upper substrates. In this state, since there are large frictional forces between the column spacer and the substrate, it is impossible to restore the shift due to the frictional forces. If the column spacers are sparsely formed between the lower and upper substrates, the LCD panel includes the hollow state at a predetermined portion having no column spacer, when the LCD panel is pressed at the predetermined portion.

The aforementioned problems are not necessarily generated separately, but are correlated with one another. The problems, such as the spots on the screen by touch and gathering of liquid crystal molecules due gravity exist in a trade-off relationship, whereby it is necessary to determine the dispersion amount of the liquid crystal material in due consideration of the aforementioned correlation. Accordingly, after determining the dispersion amount of the liquid crystal material, the density of column spacers may be determined. For example, when the column spacers are sparsely formed between the lower and upper substrates, it may be possible to overcome the problems, such as the spots on the screen by touch and gathering of liquid crystal molecules due to gravity.

Meanwhile, when the LCD panel is pressed at the predetermined portion having no column spacer, the LCD panel may have the hollow state at the predetermined portion. In this respect, it may be important to determine and scatter the proper number of the column spacers between the lower and upper substrates.

According to the present invention, column spacers having different heights may be formed on the predetermined portions of the color filter substrate corresponding to the regions of the TFT substrate. In addition to the column spacers for maintaining the cell gap between the two substrates, additional column spacers may be formed in the pixel regions to prevent the LCD panel from having the hollow state by the external impacts, thereby maintaining the cell gap. Moreover, some of the column spacers may be formed to contact or be pressed down to the opposing substrate in order to prevent the remaining column spacers from contacting the opposing substrate, thereby solving the problem of spot formation on the screen of the LCD device. Thus, some of the column spacers may be formed on the color filter substrate corresponding to the relatively high regions of the TFT substrate and may be pressed down to the TFT substrate at a predetermined thickness. Accordingly, the margin for gravity in the extent corresponding to a difference between a real height of the column spacer and a decreased height of the column spacer after the bonding process may be obtained. Furthermore, since some of the column spacers are pressed down to the opposing substrate at the predetermined thickness or more, the margin for compensating for the problems, such as gathering of the liquid crystal molecules in the respective pixel region, may be achieved. Thus, although the patterned column spacers may have different heights, non-uniformity due to gravity along entire regions of the LCD panel may be overcome.

Figure 7A:
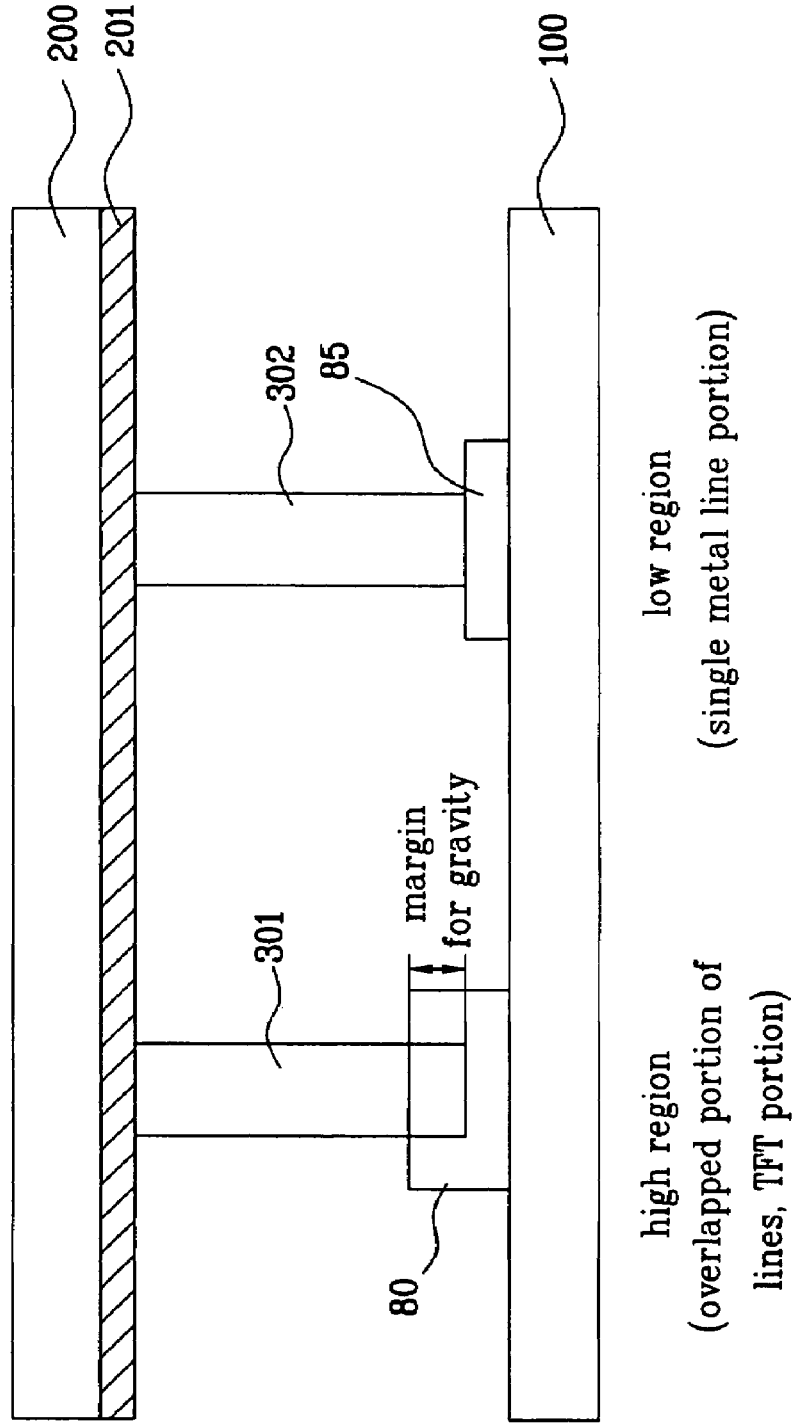

FIGS. 7A to 7C are schematic cross sectional views of an exemplary LCD device according to the present invention. In FIG. 7A, an LCD device may include a first substrate 100 and a second substrate 200 facing each other, wherein the first substrate 100 may include regions having different heights. Since the second substrate 200 opposes the first substrate 100, a first column spacer 301 may be formed on the second substrate 200 corresponding to the relatively high regions 80 of the first substrate 100, and the second column spacer 302 may be formed on the second substrate 200 corresponding to the relatively low regions 85 of the first substrate 100. In addition, the first and second column spacers 301 and 302 having the same height may be formed on a black matrix layer 201. In FIGS. 7A to 7C, the first substrate 100 may function as a lower substrate forming a TFT array thereon, wherein the relatively high region 80 may correspond to an overlapped portion of gate and data lines or a portion corresponding to a thin film transistor TFT, and the relatively low region 85 may correspond to the gate or data line.

According to the present invention, positions of the first and second column spacers 301 and 302 may be changed according to a design of the first substrate (TFT substrate) 100. Accordingly, the first column spacer 301 may be formed on the second substrate 200 corresponding to the relatively high region 80 of the first substrate 100, such as the overlapped portion of the gate and data lines, or the portion corresponding to the thin film transistor. As compared with the relatively low region 85 of the first substrate 100, the relatively high region 80 of the first substrate 100 may further include a metal line and/or a semiconductor layer. Thus, a height of the first column spacer 301 may decrease more than a height of the second column spacer 302 in the extent corresponding to a height difference between the relatively high and low regions 80 and 85. Accordingly, the decreased height of the first column spacer 301 may function as a margin for gravity.

For example, as a result of experimentation, when the relatively high region 80 of the first substrate 100 corresponding to the first column spacer 301 has the height between 2000 Å and 6000 Å, gathering of liquid crystal molecules to the predetermined portion in the LCD panel due gravity may be prevented.

In FIG. 7A, the second column spacer 302 may contact the first substrate 100, and, as shown in FIG. 7B, the second column spacer 302 may be spaced apart from the first substrate 100 at a predetermined interval of 2000 Å or less. As shown in FIG. 7C, the second column spacer 302 may be pressed down to the first substrate 100 at a predetermined thickness of 2000 Å or less. If the second column spacer 302 is pressed down to the first substrate 100 at the predetermined thickness for than 2000 Å, it may cause formation of spots on the screen of the LCD panel.

If the second column spacer 302 is spaced apart from the first substrate 301 by more than 2000 Å, a hollow portion may be formed in the LCD panel by repeated external impacts. Accordingly, arrangement of the first and second column spacers 301 and 302 on the regions having the different heights may be changed. For example, as shown in FIG. 7B, if the LCD panel is placed into a stable environment, the first column spacer 301 may be pressed down to the first substrate 100 at the thickness between 2000 Å and 400 Å, and the second column spacer may be spaced apart from the first substrate 100 at the interval of 2000 Å, thereby preventing gathering of liquid crystal molecules due to gravity.

Meanwhile, if the LCD panel is place in an unstable environment, as shown in FIG. 7C, the first column spacer 310 may obtain a margin for gravity to the extent of 4000 Å to 6000 Å, thereby reaching a margin for thermal expansion of the liquid crystal material. Accordingly, the second column spacer 302 may be pressed down to the first substrate 100 at the thickness of 2000 Å or less, to prevent the increase of frictional force between the second column spacer 302 and the first substrate 100, thereby preventing formation of spots on the screen of the LCD panel.

The first and second column spacers 301 and 302 may be formed on the black matrix layer 201 of the second substrate 200 corresponding to the gate or data line, or the portion corresponding to the thin film transistor of the first substrate 100. Although the first and second column spacers 301 and 302 having the same height may be formed on the second substrate 200, the first column spacer 301 may formed on the second substrate 200 corresponding to the relatively high region 80 of the first substrate 100. For example, the first column spacer 301 may have the height decreased to the extent corresponding to the height difference between the relatively high and low regions 80 and 85. After the bonding process, the first column spacer 301 becomes shorter than the real height thereof.

According to the present invention, the second column spacer 302 may be in contact with the first substrate 100, may be spaced apart from the first substrate 100 at the predetermined interval, or may be pressed down to the first substrate 100 at the predetermined thickness, according to the height difference between the relatively high and low regions of the first substrate 100, thereby preventing gathering of liquid crystal molecules due to gravity. Furthermore, the LCD device according to the present invention may obtain uniformity of gravity along entire regions of the LCD panel, although the column spacers may have slightly different heights due to patterning.

Figure 8:
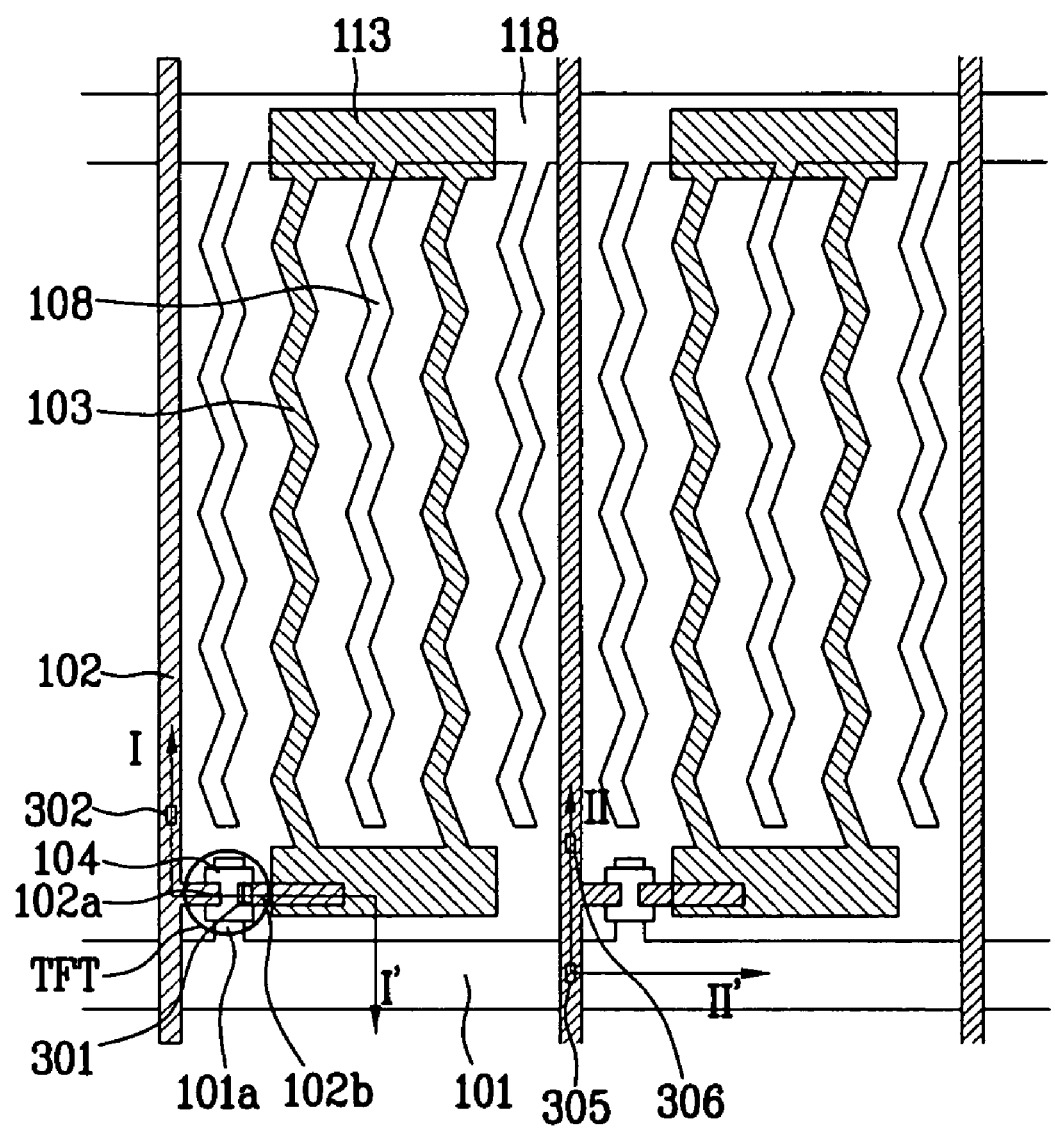
FIG. 8 is a plan view of an exemplary IPS mode LCD device according to the present invention.
Figure 9:
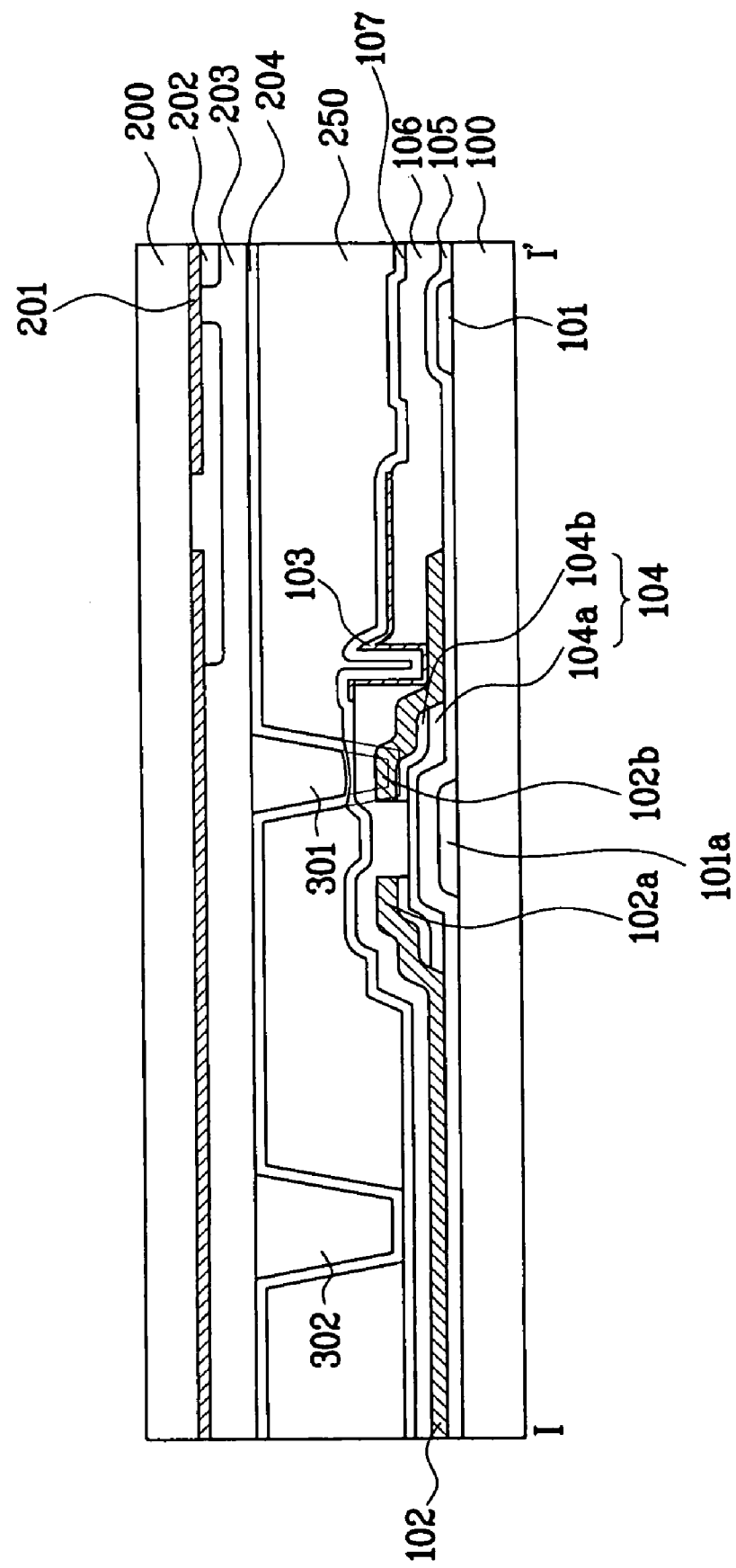
FIG. 9 is a cross sectional view along I-I' of FIG. 8 of the exemplary IPS mode LCD device of FIG. 8 according to the present invention.

FIG. 8 is a plan view of an exemplary IPS mode LCD device according to the present invention, and FIG. 9 is a cross sectional view along I-I' of FIG. 8 of the exemplary EPS mode LCD device of FIG. 8 according to the present invention. In FIG. 9, an LCD may include first and second substrates 100 and 200 bonded to each other having a predetermined interval therebetween, and a liquid crystal layer 250 formed by injecting a liquid crystal material between the bonded first and second substrates 100 and 200.

In FIG. 8, the first substrate 100 may include a plurality of gate and data lines 101 and 102, pixel and common electrodes 103 and 108, and a plurality of thin film transistors TFT, wherein the gate and data lines 101 and 102 may cross each other to define a plurality of pixel regions. In addition, the pixel and common electrodes 103 and 108 may be alternately formed within the pixel region, and the TFT may be formed at a cross portions of the gate and data lines 101 and 102. Furthermore, a common line 118 may be formed in parallel to the gate line 101 within the pixel region, and a capacitor electrode 113 that may extend from the pixel electrode 103 may overlap with the common line 118. For example, the common electrode 108 may extend from the common line 118. When forming the gate line 101, the common electrode 108 and the common line 118 may be simultaneously formed of a low-resistance metal, such as Cu, Al, Cr, Mo and Ti. In addition, the pixel electrode 103 and the common electrode 108 may be alternately formed in the pixel region.

The pixel electrode 103 may be formed on the same layer as the data line 102, or may be formed as a different layer from the data line 102. For example, as shown in FIG. 9, the pixel electrode 103 may be formed on a different layer from the data line 102. The pixel electrode 103 and the common electrode 108 may be alternately formed in parallel to each other, or may be formed having a zigzag-type pattern, as shown in FIG. 8. Furthermore, an insulating layer may be formed between the common electrode 108 and the pixel electrode 103 to separate the two patterns from each other. The insulating layer may be formed of the same material as a gate insulating layer or as the same material as a passivation layer material, such as silicon nitride or silicon oxide. Then, the TFT, which may include a gate electrode 101a, a semiconductor layer 104 covering the gate electrode 101a, and source/drain electrodes 102a and 102b at both sides of the gate electrode 101a, may be formed at the cross portions of the gate and data lines 101 and 102.

An exemplary method of forming the first substrate 100 of FIG. 7 may include using an exemplary 5-mask process. For example, a metal material, such as Mo, Al or Cr, may be formed along an entire surface of the first substrate 100 by a sputtering method, and then patterned using a first mask (not shown). Accordingly, the plurality of gate lines 101 and the gate electrodes 101a that extend from the gate lines 101 may be simultaneously formed. During the process, the common line 118 may be formed in parallel to the gate line 101, and the common electrode 108 may be formed to extend from the common line 118 of the pixel region in the zigzag-type pattern.

Next, an insulating material of SiNe may be deposited along an entire surface of the first substrate 100 including the gate lines 101, thereby forming the gate insulating layer 105. Then, an amorphous silicon layer 104a and an n+ layer 104b heavily doped with phosphorous P may be sequentially deposited onto the gate insulating layer 105, and then patterned using a second mask (not shown), thereby forming the semiconductor layer 104 having a shape covering the gate electrode 101a on the gate insulating layer 105.

Next, a metal material, such as Mo, Al or Cr, may be deposited along an entire surface of the substrate 100 by a sputtering method, and then patterned using a third mask (not shown), thereby forming the data line 102 perpendicular to the gate line 101. At the same time, the source and drain electrodes 102a and 102b may be formed at both sides of the gate electrode 101a, wherein the source electrode 102a may be formed to project from the data line 102. During the patterning process, the n+ layer 104b may be removed above the gate electrode 101a by over-etching the n+ layer below the source and drain electrodes 102a and 102b. Accordingly, a portion of the amorphous silicon layer may be exposed above the gate electrode 101a, thereby defining a channel region of the TFT. The semiconductor layer 104 may be comprised of the amorphous silicon layer and the n+ layer.

Next, a passivation layer 106 of $SiN_x$ may be deposited along an entire surface of the gate insulating layer 105 including the semiconductor layer 104 and the source/drain electrodes 102a and 102b using a chemical vapor deposition (CVD) method. The passivation layer 106 may be formed of an inorganic material, such as $SiN_x$, or may be formed of an organic material having a low dielectric constant, such as BenzoCycloButene (BCB), Spin On Glass (SOG), or acryl, to improve an aperture ratio of liquid crystal cell. Then, the passivation layer 106 may be selectively etched on the drain electrode 102b by using a fourth mask (not shown), thereby forming a contact hole exposing a portion of the drain electrode 102b.

Next, a transparent conductive material may be formed on the passivation layer 106 to fill the contact hole by using a sputtering method, and may be patterned using a fifth mask (not shown), thereby forming the pixel electrode 103 and the capacitor electrode 113. Accordingly, the pixel electrode 103 and the common electrode 108 may be alternately formed within the pixel region in the zigzag-type pattern, wherein the capacitor electrode 113 may be connected to the pixel electrode 103 on the common line 118. As shown in FIG. 9, for example, the portion corresponding to the TFT and the overlapped portion of the gate and data lines 101 and 102 may be higher than the portion corresponding to the gate or data line 101 or 102.

Next, the second substrate 200 may be formed to oppose the first substrate 100. The second substrate 200 may include a black matrix layer 201, an R/G/B color filter layer 202, and an overcoat layer 203. The black matrix layer 201 may prevent light from portions corresponding to gate and data lines and TFTs, except for respective pixel regions. The color filter layer 202 may be formed to display various colors at the portions corresponding to the respective pixel regions, and the overcoat layer 203 may be formed along an entire surface of the second substrate 200 including the black matrix layer 201 and the color filter layer 202.

Then, a plurality of first and second column spacers 301 and 302 having the same height may be formed on predetermined portions of the overcoat layer 203, corresponding to regions of the first substrate 100 having the different heights.

According to the present invention, the first column spacer 301 may be formed at the portion corresponding to the TFT of the first substrate 100, and the second column spacer 302 may be formed at the portion corresponding to the data line 102 of the first substrate 100, wherein the first and second column spacers 301 and 302 may have the same height. For example, the first column spacer 301 may correspond to a relatively high region of the first substrate 100. Thus, after a bonding process, the first column spacer 301 may be pressed down to the first substrate 100 at a thickness of about 2000 Å to about 6000 Å, due to pressure used during the bonding process.

Since the first column spacer 301 may be formed to maintain a cell gap between the two substrates 100 and 200, the first column spacer 301 may obtain a margin for compensating for gathering of liquid crystal molecules due to gravity at a region being pressed down to the first substrate 100. In addition, since the second column spacer 302 may correspond to a relatively low region of the first substrate 100, the second column spacer 302 may be pressed down less than an amount of the first column spacer 301.

In FIG. 9, since the second column spacer 302 may contact the first substrate 100, the second column spacer 302 may be spaced apart from the first substrate 100, or may be pressed down to the first substrate 100 to an amount of about 2000 Å. Accordingly, the second column spacer 200 may be formed to provide a resistive force to external impacts within the LCD display panel. Thus, a predetermined difference between the relatively high and low regions of the first substrate 100 corresponding to the first and second column spacers 301 and 302 may be necessary. Accordingly, it may be possible to prevent the second column spacer 302 from being pressed down to the first substrate 100 at the thickness above about 2000 Å. If the second column spacer 302 is pressed down to the first substrate 100 at the thickness above about 2000 Å, it may cause an increase of frictional forces between the second column spacer 302 and the first substrate 100, thereby generating spots on a screen by touch. In addition, the second column spacer 302 may be pressed down more than the first column spacer 301 at the thickness corresponding to the height difference between the relatively high and low regions of the first substrate 100 corresponding to the first and second column spacers 301 and 302.

Next, the respective arrays may be formed on the first and second substrates 100 and 200, and then the two substrates 100 and 200 may be bonded to each other. Accordingly, the first column spacer 301 may maintain the cell gap between the two bonded substrates 100 and 200, and the first column spacer 301 may be decreased at the height corresponding to the difference between the regions of the drain electrode 102b and the data line 102, whereby the first column spacer 301 may support the first and second substrates 100 and 200 to obtain a margin for gravity. Since the second column spacer 302 may be formed between the two bonded substrates 100 and 200, it may be possible to increase a density of the column spacers, thereby preventing formation of a hollow portion of the LCD panel due to external impacts.

Formation of the first and second column spacers 301 and 302 may include formation of an organic insulating layer or photosensitive organic resin, and selective removal of portions of the organic insulating layer or photosensitive organic resin. The first and second column spacers 301 and 302 may formed of an organic material having a lower hardness than that of a metal material used for forming the gate or data line. For example, when bonding the first and second substrates 100 and 200 to each other, the first column spacer 301 may first contact the relatively high region of the first substrate 100. Accordingly, since the first column spacer 301 may be pressed between the two substrates 100 and 200, the height of the first column spacer 301 may decrease. In this case, the bonding process may be performed at a compression pressure suitable for positioning the second column spacer 302 to the first substrate 100 within an amount of about ±2000 Å. The decreased height of the first column spacer 301 may function as a margin for compensating for gathering of the liquid crystal molecules on the LCD panel.

In FIG. 9, the second column spacer 302 may correspond to the relatively low region including to the data line 102 of the first substrate 100, and the first column spacer 301 may correspond to the relatively high region including the semiconductor layer 104 and the gate insulating layer 105, as well as the data line 102. Thus, the decreased height of the first column spacer 301 may correspond to a total thickness of the semiconductor layer 104 and the gate insulating layer 105. As shown in FIG. 7B, the second column spacer 302 may contact with structures on the first substrate 100 without application of the compression pressure.

Then, although not shown, first and second alignment layers may be respectively formed on the first substrate 100 having the TFT array, and the second substrate 200 having the color filter array including the first and second column spacers 301 and 302. Next, a rubbing process may be performed to the first and second alignment layers. When rubbing the first and second substrates 100 and 200, surfaces of each of the first and second alignment layers may be rubbed with the cloth at a uniform pressure and speed. Thus, polymer chains of the alignment layers may be aligned along a predetermined direction, thereby determining an initial alignment direction of the liquid crystal material.

During the bonding process, the second alignment layer 204 corresponding to the second column spacer 302 may contact the first alignment layer 107. Accordingly, the predetermined portion of the first alignment layer 107 contacting the second column spacer 302 may be pressed down since the alignment layer is relatively softer than the column spacer.

It is necessary to determine an appropriate number of the column spacers between the first and second substrates 100 and 200. For example, if excessive amounts the first and second column spacers 301 and 302 are formed within the LCD panel, the LCD panel may have a protruding portion may be created in the LCD panel during high-temperature processing. When the LCD panel is maintained along a vertical direction, the liquid crystal molecules of the LCD panel may migrate to a lower-corner direction, thereby causing a gathering of liquid crystal molecules to the predetermined portion on the LCD panel due to gravity. In addition, when the LCD panel is touched with a finger or a stylus along a predetermined direction, the liquid crystal molecules may gather at the region around the touched portion, wherein the touched portion may have no liquid crystal molecules, thereby generating spots and light leakage in the black state. Thus, it is necessary to determine and scatter the appropriate number of the column spacers between the first and second substrates 100 and 200.

In addition to the first column spacer 301, the second column spacer 302 may be formed within one pixel region, thereby increasing a density of the column spacers within the LCD panel and preventing formation of a hollow portion within the LCD panel. Furthermore, the second column spacer 302 may contact the first substrate 100, or may be spaced apart from or may be pressed down onto the first substrate within an amount of about ±2000 Å. Accordingly, a reduction of frictional forces between the second column spacer 302 and the first substrate 100 may be obtained, thereby reducing the spots on the screen.

In addition, the first and second column spacers 301 and 302 may be formed within one pixel region, thereby maintaining an appropriate density of the column spacers. Furthermore, the first column spacer 301 may correspond to the relatively high region of the first substrate 100, and the height of the first column spacer 301 may be reduced after the bonding process, thereby improving a supportive force to the first and second substrate 100 and 200. Accordingly, gathering of the liquid crystal molecules due to gravity within the LCD panel may be prevented.

According to the present invention, the first and second column spacers 301 and 302 may be respectively formed on the second substrate 200 corresponding to the relatively high and low regions of the first substrate 100. For example, the first column spacer 301 may correspond to the relatively high region of the first substrate 100 to maintain the cell gap between the first and second substrates 100 and 200, thereby preventing gathering of liquid crystal molecules due to gravity. In addition, the second column spacer 302 may correspond to the relatively low region of the first substrate 100 to prevent the spots on the screen due to touching, thereby preventing formation of the hollow portions within the LCD panel.

According to the present invention, the second column spacer 302 may contact the first substrate 100, or may be spaced apart from or may be pressed down onto the first substrate 100. Thus, although the LCD panel may be touched, restoration of the liquid crystal molecules to an original state within the LCD panel may be accomplished since the frictional forces may be decreased between the first and second substrates 100 and 200.

In addition, the highest region of the first substrate 100 may be changed according to a design of the TFT array. Since the highest region of the first substrate 100 may correspond to the drain electrode 102b of the TFT, a contact region between the drain electrode 102b and the pixel electrode, or between the source electrode 102a of the TFT may be the highest region of the first substrate 100 according to the design of the TFT array. Furthermore, formation of an ITO layer along an entire surface of a rear side of the second substrate 200 may prevent static electricity on the LCD panel.

Figure 10:
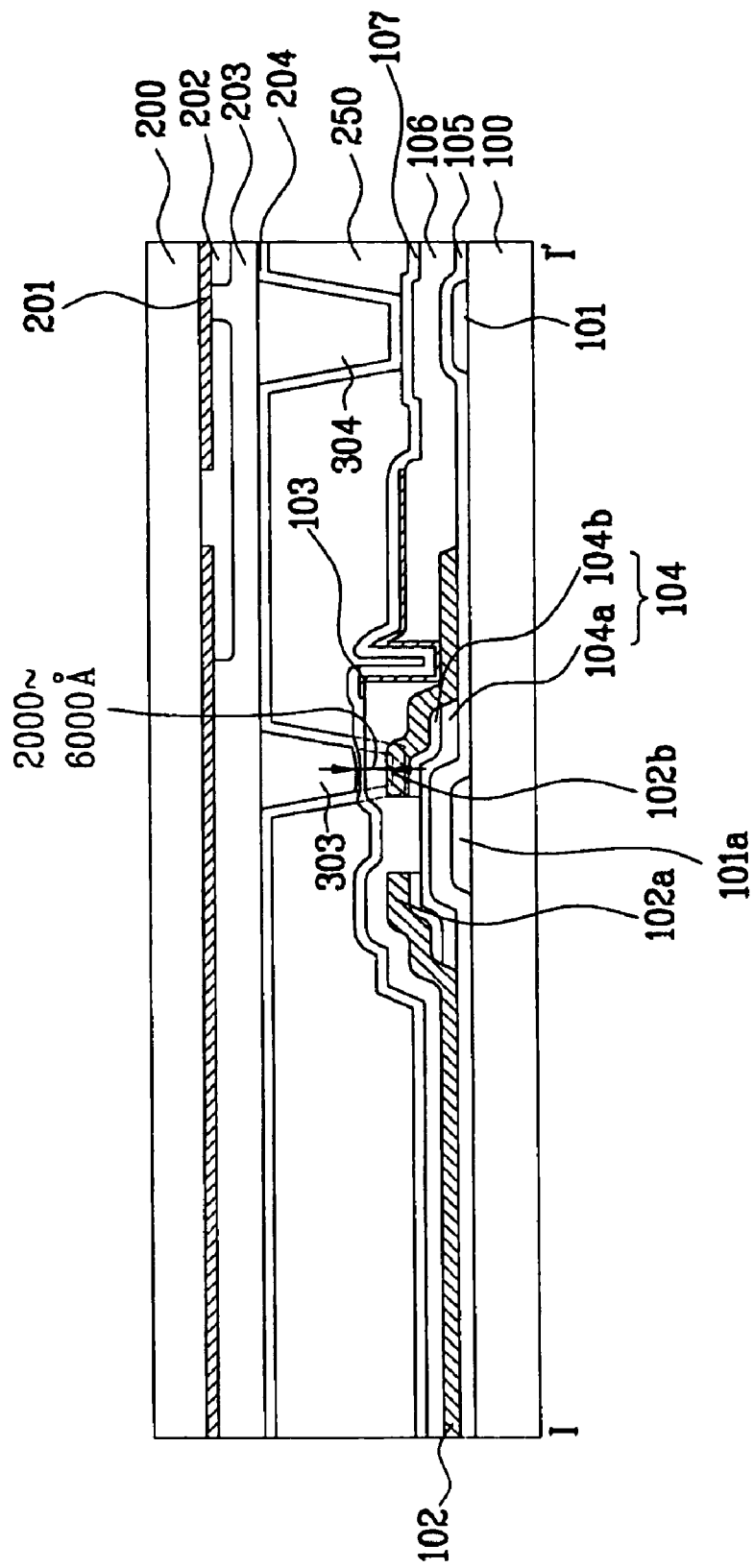
FIG. 10 is a cross sectional view along line I-I' of FIG. 8 of another exemplary IPS mode LCD device according to the present invention.

FIG. 10 is a cross sectional view along line I-I' of FIG. 8 of another exemplary IPS mode LCD device according to the present invention. In FIG. 10, an LCD device may include a first substrate 100, a second substrate 200, a first column spacer 301, and a second column spacer 302, wherein the first column spacer 301 may be formed on the second substrate 200 corresponding to a portion of a TFT of the first substrate 100. The second column spacer 302 may be formed on the second substrate 200 corresponding to a gate line 101 of the first substrate 100. Except that, the LCD device may have similar structures as that of the LCD device shown in FIG. 9 of the present invention. In addition, the first and second column spacers 303 and 304 may have similar functions as those according to the LCD device shown in FIG. 9 of the present invention. Accordingly, specific detailed description of all the features of FIG. 10 has been excluded for the sake of brevity.

Figure 11:
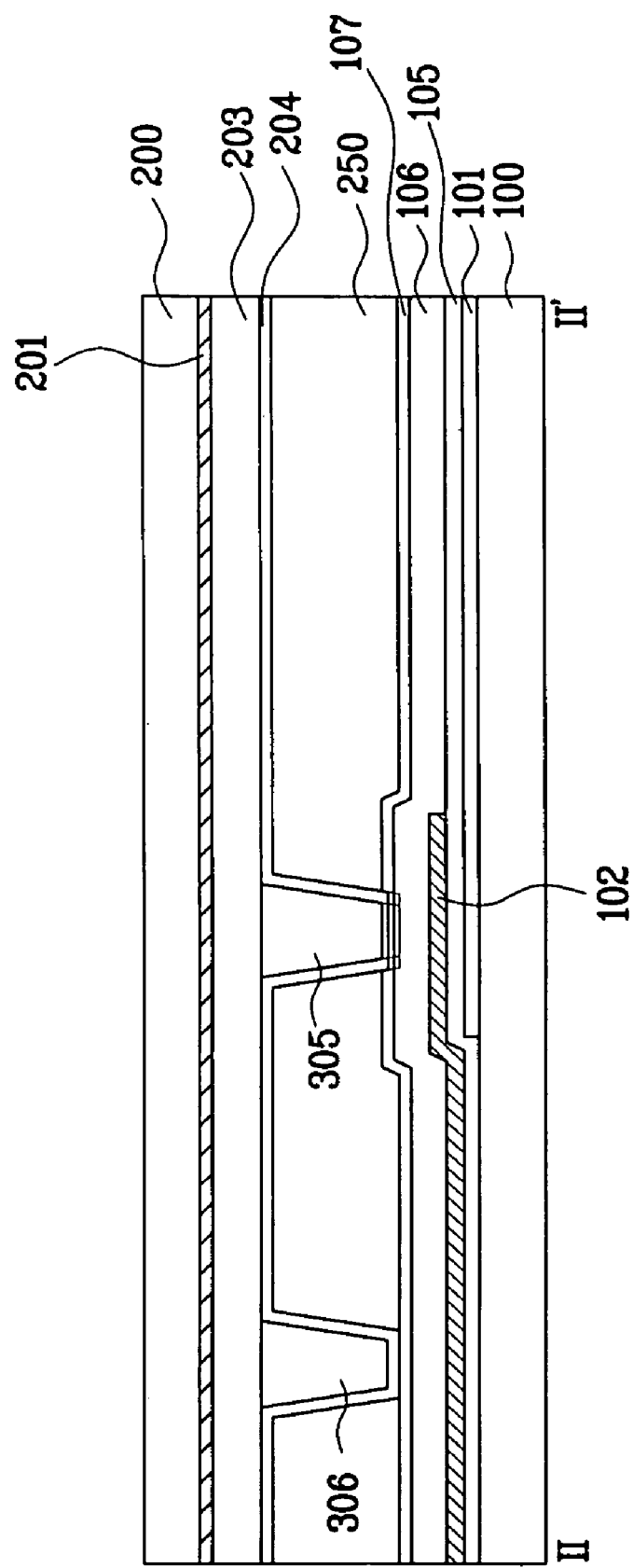
FIG. 11 is a cross sectional view along II-II' of FIG. 8 of another exemplary IPS mode LCD device according to the present invention.

FIG. 11 is a cross-sectional view taken along line III-III' of FIG. 8 in an LCD device according to the third embodiment of the present invention. In the LCD device according to third embodiment of the present invention, as shown in FIG. 11, a first column spacer 305 is formed on a second substrate 200 corresponding to an overlapped portion between gate and data lines 101 and 102, a relatively high region of a first substrate 100, and a second column spacer 306 is formed on the second substrate 200 corresponding to the data line 102, a relatively low region of the first substrate 100. Like those in the LCD devices according to the first and second embodiments of the present invention, the first and second column spacers 305 and 306 are formed on the second substrate 200 corresponding to the regions having the different heights, thereby preventing problems such as spots on an LCD Panel by touch, gather of liquid crystal molecules to a predetermined direction of the LCD panel by gravity, and a hollow portion in the LCD panel by external impacts. Although not shown, supposing that the gate and data lines 101 and 102 have the same height, it is possible to form the first column spacer 305 on the second substrate 200 corresponding to the overlapped portion of the gate and data lines 101 and 102, and to form the second column spacer 306 on the second substrate 200 corresponding to the gate line 101.

Figure 12:
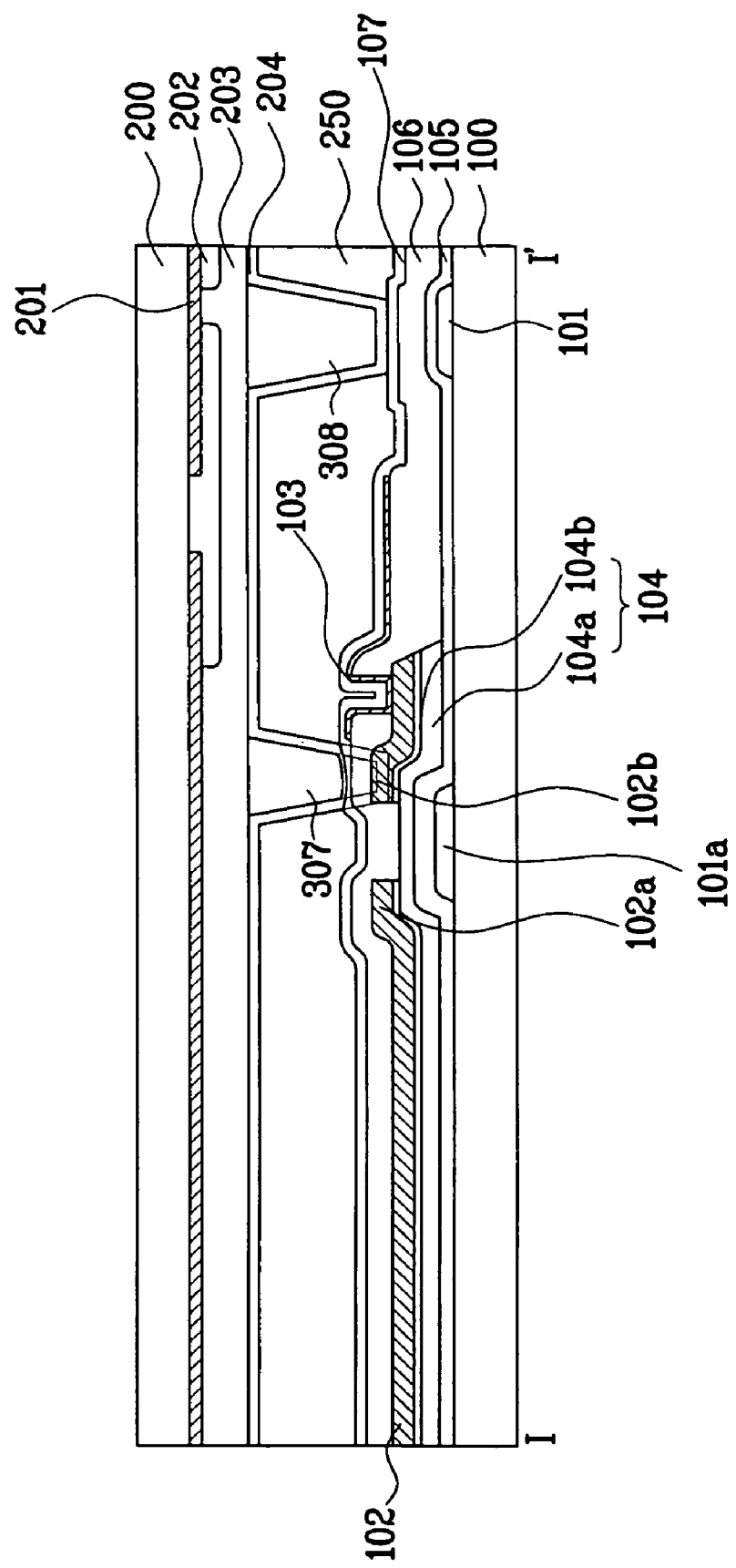
FIG. 12 is a cross sectional view along I-I' of FIG. 8 of another exemplary IPS mode LCD device according to the present invention.

FIG. 12 is a cross sectional view along I-I' of FIG. 8 of another exemplary IPS mode LCD device according to the present invention. An exemplary method of manufacturing an LCD device using a 4-mask process according to the present invention will be described with reference to FIG. 12. In FIG. 12, a metal material, such as Mo, Al or Cr, may be formed along an entire surface of a first substrate 100 by a sputtering method, and patterned using a first mask (not shown), thereby simultaneously forming a gate line 101, and a gate electrode 101a extending from the gate line 101. During the process, a common line 118 may be formed in parallel to the gate line 101, and a common electrode 108 may be formed to extend from the common line 118 in a zigzag-type pattern. Then, a gate insulating layer 105, an amorphous silicon layer 104a, an $n^+$ layer 104b, and source/drain electrode layers similar to a data line may be sequentially deposited along an entire surface of the first substrate 100 including the gate line 101.

Next, the source/drain electrode layers, the $n^+$ layer 104b, and the amorphous silicon layer 104a may be selectively removed using a second mask (not shown), thereby forming a data line 102 and a projecting pattern from the data line 102 to the drain electrode. Accordingly, the $n^+$ layer 104b and the amorphous silicon layer 104a each having a same width may be formed below the patterned source/drain electrode layers.

Next, the source/drain electrode layers and the $n^+$ layer 104b corresponding to a channel region of a semiconductor layer may be removed having a same width by using the second mask (not shown), thereby forming source/drain electrodes 102a /102b and the semiconductor layer 104a and 104b having the channel region. Accordingly, the second mask (not shown) may be a diffraction mask, wherein a photoresist for a transmission part may be removed completely, a photoresist for a semi-transmission part may be removed at a predetermined thickness, and a photoresist for a closed part may be maintained at an initial thickness. In addition, the closed part may be defined corresponding to the source/drain electrodes 102a/102b and the data line 102, and the semi-transmission part may be defined corresponding to the channel region between the source electrode 105a and the drain electrode 105b.

Then, a passivation layer 106 of SiNe may be deposited along an entire surface of the gate insulating layer 105 including the semiconductor layer 104 and the source/drain electrodes 102a and 102b using a CVD method. Alternatively, the passivation layer 106 may be formed of an organic material having a low dielectric constant, such as BCB, SOG, or acryl, to improve an aperture ratio of a liquid crystal cell. Next, the passivation layer 106 may be selectively etched on the drain electrode 102b by using a third mask (not shown), thereby forming a contact hole exposing a portion of the drain electrode 102b.

Next, a transparent conductive material may be formed on the passivation layer 106 to fill the contact hole by a sputtering method, and then patterned using a fourth mask (not shown), thereby forming a pixel electrode 103 that may be alternately formed with the common electrode 108 within the pixel region.

Next, a second substrate 200 may be formed to oppose the first substrate 100. The second substrate 200 may include a black matrix layer 201, an R/G/B color filter layer 202, and an overcoat layer 203. The black matrix layer 201 may block light from portions corresponding to gate and data lines and TFTs, except for respective pixel regions. The color filter layer 202 may be formed to display various colors at the portions corresponding to the respective pixel regions, and the overcoat layer 203 may be formed along an entire surface of the second substrate 200 including the black matrix layer 201 and the color filter layer 202.

Next, a plurality of first and second column spacers 307 and 308 having the same height may be formed on predetermined portions of the overcoat layer 203, corresponding to regions of the first substrate 100 having the different heights. Accordingly, the first column spacer 307 may be formed on the second substrate 200 corresponding to a high region defined as a contact region between the TFT and the pixel electrode of the first substrate 100. Then, the second column spacer 308 may be formed on the second substrate 200 corresponding to a low region of the gate line on the first substrate 100. Thus, the first column spacer 307 may maintain a cell gap between the first and second substrates 100 and 200, and the second column spacer 308 may control a density of the column spacers to prevent formation of a hollow portion with the LCD panel due to external impacts.

Accordingly, the first column spacer 307 corresponding to the contact region between the drain electrode 102b of the thin film transistor and the pixel electrode 103 may have the height suitable for supporting the first and second substrates 100 and 200. After forming the first and second column spacers 307 and 308, the first and second substrates 100 and 200 may be bonded to each other. When the bonding process is completed, the height of the first column spacer 307 may be reduced by an amount corresponding to a difference between the high and low regions of the first substrate 100 corresponding to the first and second column spacers 307 and 308. In addition, the second column spacer 308 may contact the first substrate 100.

In FIG. 12, the first and second column spacer 307 and 308 may be respectively formed on the second substrate 200 corresponding to the portions of the TFT and the gate line on the first substrate 100, since the black matrix layer 201 may cover the portions of the TFT and the gate line, thereby preventing reduction of an aperture ratio. Accordingly, the first and second column spacers 307 and 308 may be formed on the black matrix layer 201 of the second substrate 200 to prevent the reduction of the aperture ratio.

Next, first and second alignment layers 107 and 204 may be formed on the first substrate 100 having the TFT array and formed on the second substrate 200 having the color filter array, respectively. Then, a rubbing process may be performed to the first and second alignment layers 107 and 204. During rubbing of the first and second substrates 100 and 200, surfaces of the first and second alignment layers 107 and 204 may be rubbed with a cloth at a uniform pressure and speed. Thus, polymer chains of the alignment layers may be aligned along a predetermined direction, thereby determining an initial alignment direction of the liquid crystal material.

Figure 13:
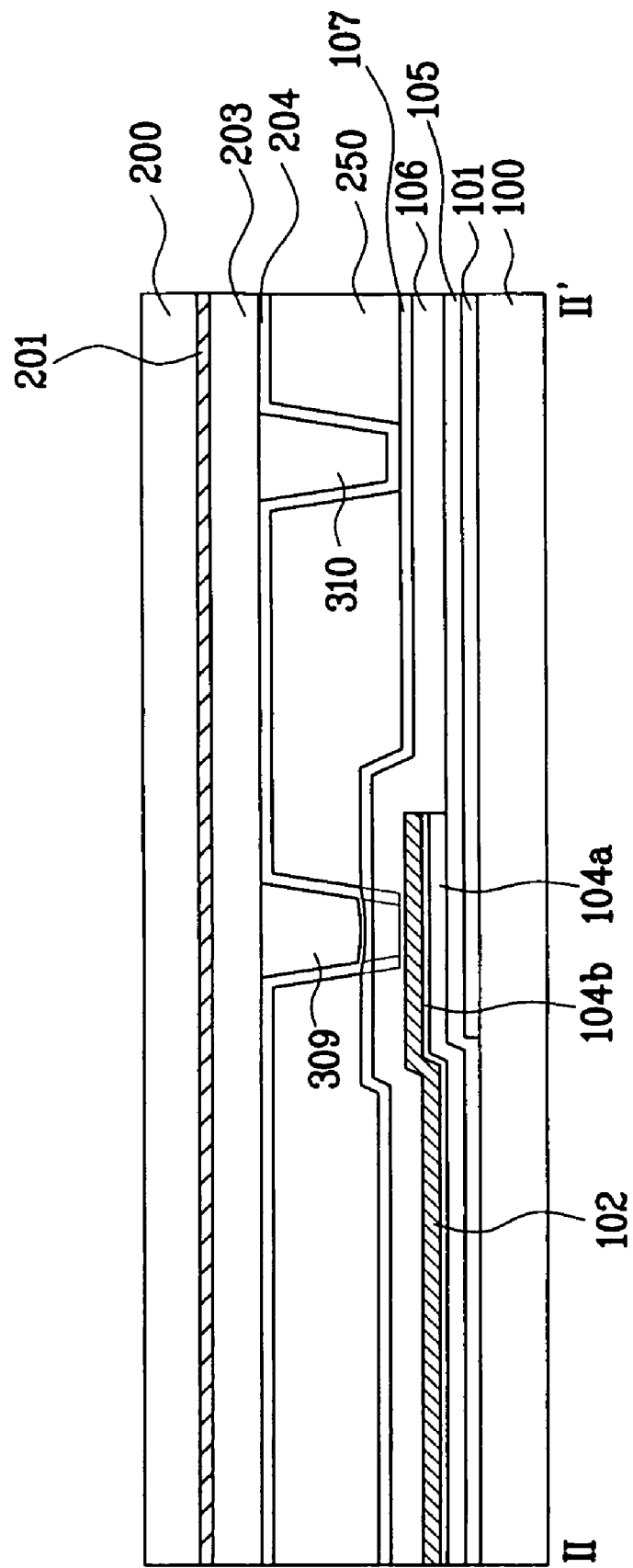
FIG. 13 is a cross sectional view along II-II' of FIG. 8 of another exemplary IPS mode LCD device according to the present invention.

FIG. 13 is a cross sectional view along II-II' of FIG. 8 of another exemplary IPS mode LCD device according to the present invention. In FIG. 13, an LCD device may have similar structures as that of the LCD device of FIG. 11 according to the present invention, except for a first column spacer 309 corresponding to an overlapped portion of gate and data lines 101 and 102, and a second column spacer 310 corresponding to the gate line 101. In FIG. 13, the LCD device may be manufactured using 4 masks, whereby the data line 102, an n$^+$ layer 102b, and an amorphous silicon layer 104a may be patterned using one mask. Thus, the data line 102 may be formed with a semiconductor layer 104a and 104b, except for a portion corresponding to a channel region of the amorphous silicon layer 104a. Accordingly, the overlapped portion of the gate and data lines 101 and 102 may further include the amorphous silicon layer 104a, the n$^+$ layer 104a, and the data line 102, as compared with the portion forming the data line 101. For example, the overlapped portion of the gate and data lines 101 and 102 may be higher than the portion of the gate line 101 by an amount corresponding to a total combined thickness of the amorphous silicon layer 104a, the n$^+$ layer, and the data line 102. When the first column spacer 309 corresponds to the overlapped portion of the gate and data lines 101 and 102, and the second column spacer 310 corresponds to the gate line 101, the first column spacer 309 may be pressed down by an amount more than the second column spacer 310 to the first substrate 100 by an amount corresponding to the total combined thickness of the amorphous silicon layer 104a, the n$^+$ layer, and the data line 102.

Figure 14:
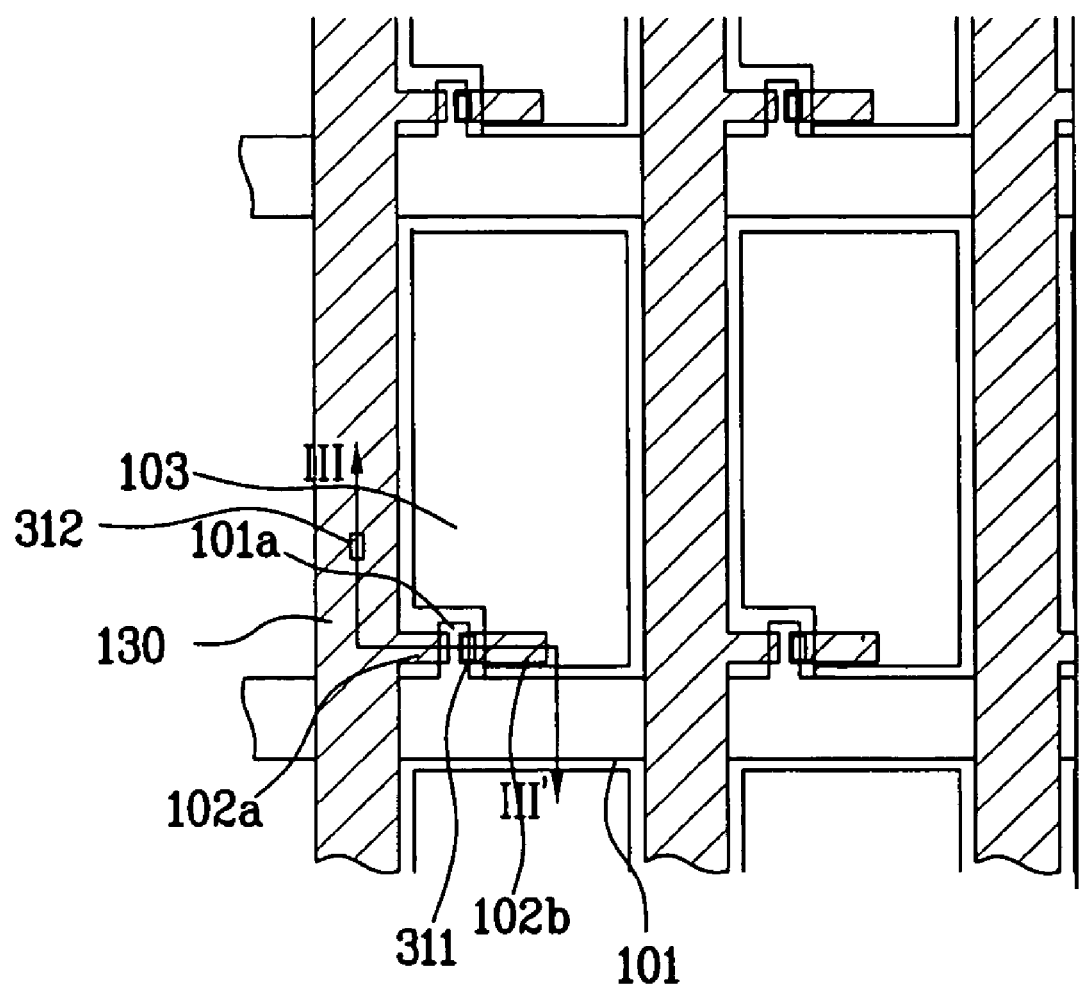
FIG. 14 is a plane view of an exemplary TN mode LCD device according to the present invention.
Figure 15:
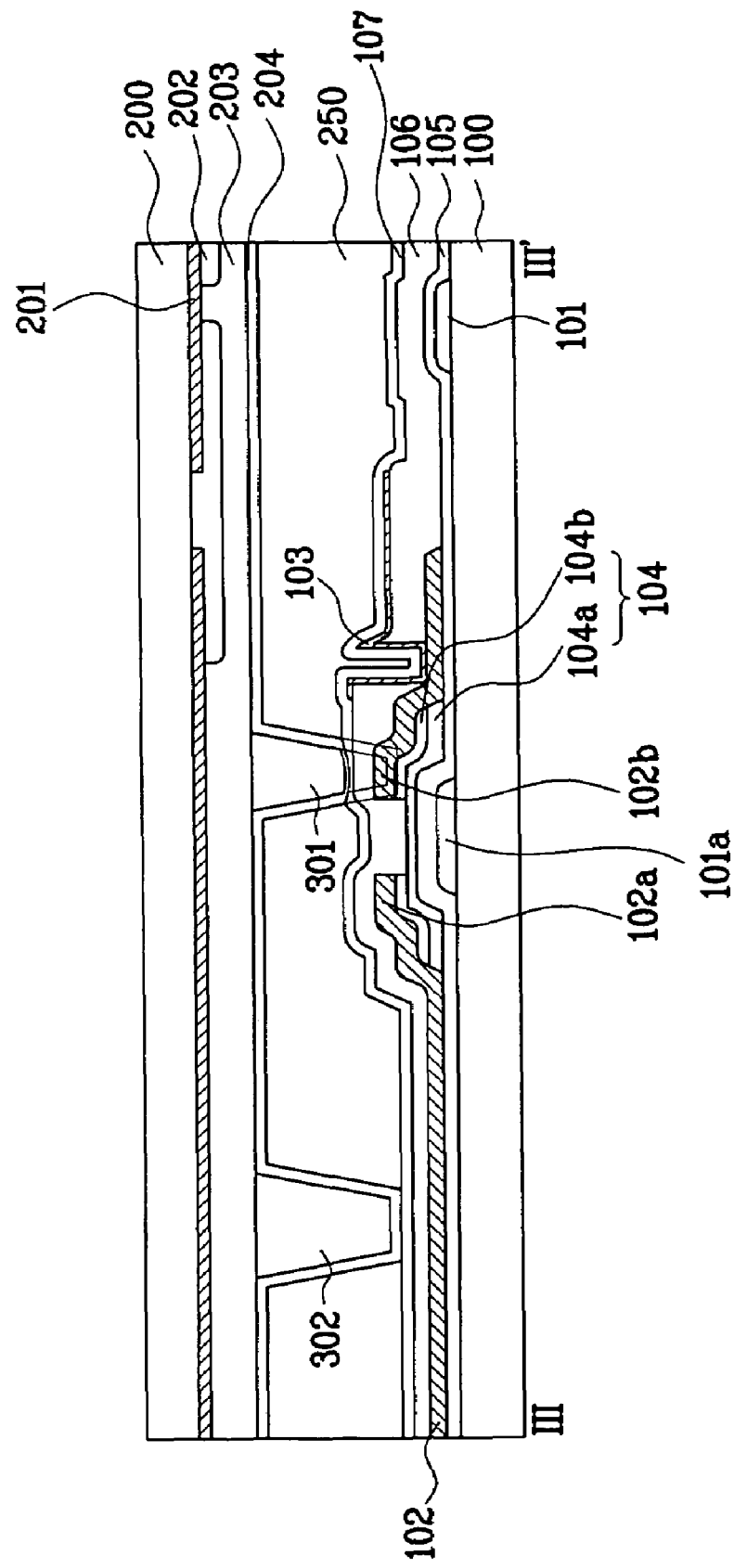
FIG. 15 is a cross sectional view along III-III' of FIG. 9 according to the present invention.

FIG. 14 is a plane view of an exemplary TN mode LCD device according to the present invention, and FIG. 15 is a cross sectional view along III-III' of FIG. 9 according to the present invention. In FIG. 14 and FIG. 15, an LCD device may include first and second substrates 100 and 200 bonded to each other having a predetermined interval therebetween, and a liquid crystal layer 250 formed by injecting liquid crystal material between the first and second substrates 100 and 200. The first substrate 100 may include a plurality of gate and data lines 101 and 102, pixel electrodes 103, and TFTs. Accordingly, the gate and data lines 101 and 102 may cross on the first substrate 100 to define a plurality of pixel regions, wherein the pixel electrodes 103 may each be formed within the pixel regions. In addition, each of the TFTs may be formed at the crossing portions of the gate and data lines 101 and 102, and may each include a gate electrode 101a, a semiconductor layer 104 covering the gate electrode 101a, and source/drain electrodes 102a/102b corresponding to the gate electrode 101a.

Operation of the TN mode LCD device is different from operational of an IPS mode LCD device in that the pixel electrode is formed as one pattern within the pixel region of the first substrate 100, and a common electrode 205, instead of an overcoat layer 203 (in FIG. 9) is formed along an entire surface of the second substrate 200. The LCD device of FIGS. 14 and 15 of the present invention may have similar structures as those of the LCD devices of FIGS. 7-13 of the present invention. Accordingly, detailed description of each of the features of FIGS. 14 and 15 have been omitted for the sake of brevity.

An exemplary method of manufacturing the LCD device of FIG. 14 and 15 of the present invention may include forming a metal material, such as Mo, Al or Cr, along an entire surface of the first substrate 100 by a sputtering method, and patterned using a first mask (not shown), thereby simultaneously forming the plurality of gate lines 101, and gate electrodes 101a extending from the gate lines 101.

Then, an insulating material of SiN$_x$ may be deposited along the entire surface of the first substrate 100 including the gate lines 101, thereby forming a gate insulating layer 105. Next, an amorphous silicon layer 104a and an n$^+$ layer 104b heavily doped with phosphorous P may be sequentially deposited onto the gate insulating layer 105, and then patterned using a second mask (not shown), thereby forming the semiconductor layer 104 having a shape covering the gate electrode 101a on the gate insulating layer 105.

Next, a metal material, such as Mo, Al or Cr, may be deposited along the entire surface of the substrate by a sputtering method, and patterned using a third mask (not shown), thereby forming the data line 102 perpendicular to the gate line 101.

Then, the source and drain electrodes 102a and 102b may be simultaneously formed at both sides of the gate electrode 101a, wherein the source electrode 102a may project from the data line 102. During the metal patterning process, the n$^+$ layer 104b may be removed above the gate electrode 101a by over-etching the n$^+$ layer below the source and drain electrodes 102a and 102b. Accordingly, a portion of the amorphous silicon layer may be exposed above the gate electrode 101a, thereby defining a channel region of the TFT, wherein the semiconductor layer 104 may be comprised of the amorphous silicon layer and the n$^+$ layer.

Then, a passivation layer 106 of SiN$_x$ may be deposited along the entire surface of the gate insulating layer 105 including the semiconductor layer 104 and the source/drain electrodes 102a and 102b using a CVD method. Alternatively, the passivation layer 106 may be formed of an organic material having a low dielectric constant, such as BCB, SOG, or acryl, to improve an aperture ratio of the liquid crystal cell. Then, the passivation layer 106 may be selectively etched on the drain electrode 102b using a fourth mask (not shown), thereby forming a contact hole exposing a portion of the drain electrode 102b.

Next, a transparent conductive material may be formed on the passivation layer 106 to fill the contact hole by a sputtering method, and then patterned using a fifth mask (not shown), thereby forming the pixel electrode 103 within the pixel region. The portion corresponding to the TFT and the overlapped portion of the gate and data lines 101 and 102 may be higher than the portion corresponding to the gate or data line 101 or 102.

Next, the second substrate 200 may be formed to oppose the first substrate 100. The second substrate 200 may include a black matrix layer 201, an R/G/B color filter layer 202, and a common electrode 203. The black matrix layer 201 may block light from portions corresponding to gate and data lines 101 and 102 and the TFTs, except for respective pixel regions. The color filter layer may be formed to display various colors at the portions corresponding to the respective pixel regions, and the common electrode 203 may be formed along an entire surface of the second substrate 200 including the black matrix layer 201 and the color filter layer 202.

Next, a plurality of first and second column spacers 311 and 312 having the same height may be formed on predetermined portions of the common electrode 203, corresponding to regions of the first substrate 100 having the different heights. Accordingly, the first column spacer 311 may be formed on the second substrate 200 corresponding to the TFT of the first substrate 100, and the second column spacer 312 may be formed on the second substrate 200 corresponding to the data line 102 of the first substrate 100.

The LCD device may be manufactured by applying the IPS mode LCD device to the TN mode LCD device. In addition, the LCD device and the method of manufacturing the same according to the present invention may be characterized by the plurality of column spacers having the same height formed on the second substrate (i.e., color filter substrate) corresponding to the predetermined regions of the first substrate (i.e., TFT array substrate) having the different heights. Accordingly, the height difference between the regions may be variable according to a design of the array process on the first substrate. According to the present invention, the first and second column spacers may be formed on the black matrix layer of the second substrate corresponding to the highest and lowest regions of the first substrate, respectively. However, the highest and lowest regions of-the first substrate may be changed according to processing methods. Accordingly, if the first column spacer contacts the first substrate, and the second column spacer is spaced apart from the first substrate at the predetermined interval, it may be possible to obtain the same effect.

As mentioned above, the LCD device according to the present invention and the method of manufacturing the same has the following advantages. First, in addition to the first column spacer for maintaining the cell gap between the two substrates, the second column spacer may be additionally formed within one pixel region, thereby increasing a density of the column spacers within the LCD panel. Thus, it may be possible to prevent formation of a hollow portion within the LCD panel. In addition, the plurality of column spacers having the same height may be formed on the second substrate corresponding to the regions of the first substrate having the different heights. Thus, some of column spacers may contact the first substrate. Then, the remaining column spacers may be pressed down to the first substrate by a predetermined thickness, and the heights thereof may be reduced by the predetermined thickness being pressed down to the first substrate. Thus, it is possible to obtain a margin for gravity by an amount corresponding to the decreased height of the column spacer.

Furthermore, the column spacers corresponding to the low region of the first substrate may just contact the first substrate or may be pressed down to the first substrate within an amount of about 2000 Å during the bonding process. Thus, it may be possible to reduce the frictional forces between the column spacer and the first substrate, thereby preventing the spots on the LCD panel due to touching.

According to the design of the TFT array on the first substrate, the highest and lowest regions of the first substrate may be determined, and the first and second column spacers having the same height may correspond to the highest and lowest regions of the first substrate. Thus, it may be possible to prevent gathering of liquid crystal molecules due to gravity without changing the spacer formation process. In addition, since some of the column spacers may be pressed down to the opposing substrate at the predetermined thickness or more, it may be possible to obtain a margin for compensating for the gathering of the liquid crystal molecules within the respective pixel regions. Thus, although the patterned column spacers may have the different heights, it may be possible to obtain uniformity of gravity along entire regions of the LCD panel.

It will be apparent to those skilled in the art that various modifications and variations can be made in the liquid crystal display device and method of fabricating the same of the present invention. Thus, it is intended that the present invention cover the modifications and variations of this invention provided they come within the scope of the appended claims and their equivalents.

What is claimed is:

1. A liquid crystal display (LCD) device, comprising:
   first and second substrates facing each other;
   a plurality of gate and data lines on the first substrate, the gate and data lines crossing each other at crossing regions to define a plurality of pixel regions;
   a plurality of thin film transistors each formed at the crossing region of the gate and data lines;
   a plurality of pixel and a plurality of common electrodes on the same substrate each within one of the pixel regions;
   a first column spacer on the second substrate corresponding to one of the thin film transistors of the first substrate;
   a second column spacer on the second substrate corresponding to the gate lines of the first substrate; and
   a liquid crystal layer between the first and second substrates,
   wherein a height of the first column spacer decreases within a range of about 2000 Angstroms to about 6000 Angstroms and wherein the second column spacer is spaced apart from the first substrate by a first interval when the first substrate and the second substrate are bonding each other and no external compressive pressure is applied to the first substrate or the second substrate.

2. The device according to claim 1, wherein the first and second column spacers have substantially the same height before the first substrate and the second substrate are facing each other.

* * * * *